United States Patent
Izumi

(10) Patent No.: US 9,329,691 B2
(45) Date of Patent: May 3, 2016

(54) OPERATION INPUT APPARATUS AND METHOD USING DISTINCT DETERMINATION AND CONTROL AREAS

(75) Inventor: Kenji Izumi, Shimane (JP)

(73) Assignee: Shimane Prefectural Government, Shimane (JP)

( * ) Notice: Subject to any disclaimer, the term of this patent is extended or adjusted under 35 U.S.C. 154(b) by 0 days.

(21) Appl. No.: 13/824,955

(22) PCT Filed: Sep. 22, 2011

(86) PCT No.: PCT/JP2011/005354
§ 371 (c)(1),
(2), (4) Date: Mar. 18, 2013

(87) PCT Pub. No.: WO2012/039140
PCT Pub. Date: Mar. 29, 2012

(65) Prior Publication Data
US 2013/0181897 A1    Jul. 18, 2013

(30) Foreign Application Priority Data

Sep. 22, 2010  (JP) ................................. 2010-212582
Jul. 5, 2011  (JP) ................................. 2011-149037

(51) Int. Cl.
*G06F 3/01*  (2006.01)
(52) U.S. Cl.
CPC ...................... *G06F 3/017* (2013.01)
(58) Field of Classification Search
CPC ......... G06F 3/0304; G06F 3/03; G06F 3/011; G06F 3/017; G06T 2207/30196; G06T 7/0075; G06T 7/004; A63F 2300/1068; A63F 2300/1093

USPC .......... 345/156–158; 382/103, 118, 154, 181, 382/190, 291; 715/848, 863; 348/169; 379/52

See application file for complete search history.

(56) References Cited

U.S. PATENT DOCUMENTS

| | | |
|---|---|---|
| 2004/0242988 A1 | 12/2004 | Niwa et al. |
| 2009/0027337 A1 | 1/2009 | Hildreth |
| 2009/0031240 A1 | 1/2009 | Hildreth |
| 2009/0183125 A1 | 7/2009 | Magal et al. |
| 2009/0296991 A1 | 12/2009 | Anzola |

(Continued)

FOREIGN PATENT DOCUMENTS

| | | |
|---|---|---|
| CA | 2 726 895 A1 | 12/2009 |
| CN | 101810003 A | 8/2010 |

(Continued)

OTHER PUBLICATIONS

Japanese Official Notice of Rejection, mailed Jul. 9, 2013, with English Translation, for Japanese Patent Application No. 2011-149037, 8 pages.

(Continued)

*Primary Examiner* — Lun-Yi Lao
*Assistant Examiner* — Elliott Deaderick
(74) *Attorney, Agent, or Firm* — Seed IP Law Group PLLC

(57) ABSTRACT

A motion input is appropriately identified. A display is disposed in front of an operator, and a motion, performed by the operator within ranges set in predetermined right and left positions between the operator and the display, is identified. In certain circumstances, the shape of a finger of the operator may be handled as an object of an operational determination.

19 Claims, 24 Drawing Sheets

(56) References Cited

U.S. PATENT DOCUMENTS

| | | | |
|---|---|---|---|
| 2010/0235786 A1* | 9/2010 | Maizels et al. | 715/810 |
| 2011/0141009 A1 | 6/2011 | Izumi | |
| 2011/0163954 A1* | 7/2011 | Kim et al. | 345/158 |
| 2011/0164032 A1* | 7/2011 | Shadmi | 345/419 |
| 2011/0197263 A1* | 8/2011 | Stinson, III | 726/4 |
| 2011/0199291 A1* | 8/2011 | Tossell et al. | 345/156 |
| 2011/0199302 A1* | 8/2011 | Tossell et al. | 345/158 |

FOREIGN PATENT DOCUMENTS

| | | | |
|---|---|---|---|
| EP | 2 287 708 A1 | | 2/2011 |
| JP | 2003-186596 A | | 7/2003 |
| JP | 2004-78977 A | | 3/2004 |
| JP | 2004-258714 A | | 9/2004 |
| JP | 2008-15942 A | | 1/2008 |
| JP | 2009-87095 A | | 4/2009 |
| JP | 2009-151424 A | | 7/2009 |
| JP | 2010-15553 A | | 1/2010 |
| JP | 2010-534895 A | | 11/2010 |
| WO | 2009-018161 A1 | | 2/2009 |
| WO | WO 2009148064 A1 * | | 12/2009 |

OTHER PUBLICATIONS

Nakamura et al., "Hand Gesture Interaction for Large Public Display," Graduate School of System and Information Engineering, University of Tsukuba, 5 pages, 2012.

Yamamoto et al., "PALMbit-Silhouette: Superimposing Palm-Silhouette to Access Distributed Large Displays," *The Journal of The Institute of Image Information and Television Engineers* 62(12):pp. 1988-1996, 2008.

Japanese Decision to Grant a Patent with English Translation for Japanese Patent Application No. 2010-212582, mailed Nov. 6, 2012, 6 pages.

Japanese Official Notice of Rejection with English Translation for Japanese Patent Application No. 2010-212582, mailed Jan. 31, 2012, 7 pages.

Japanese Official Notice of Rejection with English Translation for Japanese Patent Application No. 2010-212582, mailed Sep. 9, 2011, 6 pages.

Nakamura et al., "Hand Gesture Interaction for Large Public Display," *DICOMO2006,* Information Processing Society of Japan, Jul. 2006, pp. 833-836, English Translation, 11 pages.

Office Action issued on Apr. 15, 2015, Chinese Application No. 201180045563.7 (5 pgs.).

* cited by examiner

OPERATION INPUT APPARATUS AND METHOD USING DISTINCT DETERMINATION AND CONTROL AREAS

TECHNICAL FIELD

The current disclosure is generally related to an operation input apparatus and an operation determining method, and in particular, to determining a motion of a measured object based on an image, such as an image captured by a video camera or in another manner.

BACKGROUND

In recent years, various input methods have been employed for computers, game machines and the like. For example, a system has been proposed which recognizes a motion of an operator such as a predefined gesture through the imaging thereof using a camera or the like and determines to which of operational contents the gesture corresponds. For example, PTL1 proposes a technology of enabling a very easy and convenient apparatus operation without necessity of an input apparatus such as a mouse, and the technology includes: a host computer recognizing the shape and the motion of an object in an image imaged by a CCD camera; and a display displaying the shape and the motion of the object recognized by the host computer, and wherein, when a user gives an instruction by means of a hand gesture or the like while being faced to the CCD camera, the given hand gesture is displayed on a display screen of the display and a virtual switch or the like displayed on the display screen can be selected using an icon of an arrow cursor by means of a hand gesture.

On the other hand, in operating a computer, an operator matches a pointer with a predetermined position such as a button or an input field displayed on a display by moving a mouse, and settles an operational content such as "pressing the button" or "starting inputting into the input field" by making a click or the like. Thus, conventionally using a mouse, pointing or focusing (selecting) is executed and a click button is pressed once in a predetermined position, whereby selection of the position or the like can be executed. Furthermore, various applications associated with pointed positions can be executed by consecutively pressing the click button twice (so called double-click). Alternatively, such operation as drag for connecting a pointed position to a destination is enabled. An input keyboard is normally used for inputting a piece of specific information such as a numeric value or a character, and therefore, an operator outputs a piece of desired information or inputs a piece of necessary information and is supposed to repeat moving by means of the mouse and inputting by means of the keyboard.

Furthermore, to achieve enhancement in convenience regarding an operation of an operator without requiring an operator to wear a special apparatus, a technology has been proposed that enables an operator to perform a click operation, a drag operation, a double-click operation and the like as a mouse operation with respect to a display image and to draw and input a desired line, diagram, character or the like by defining a virtual plane G or a virtual keyboard H, for instance, in an appropriate space part as operating means corresponding to a keyboard, a mouse or the like (e.g., see PTL2).

CITATION LIST

Patent Literature

PTL1: Japanese Patent Laid-Open No. 2004-78977
PTL2: Japanese Patent Laid-Open No. 2004-258714

BRIEF SUMMARY

However, in actually existing technologies, satisfaction has not been obtained for a gesture operation and the like without using apparatuses such as a mouse, a keyboard, a touch panel and the like, because of such drawbacks as: necessity of a non-intuitive complex motion; physical burden imposed in performing an exaggerated motion; low visibility of an operation object screen caused by an operator oneself due to the hand in use of an operation as seen in PTL2; and erroneous recognition attributed to ambiguity of "connection" between motions of an gesture operation. Especially, PTL2 seems to be an effective technology at first glance because an operation input is enabled without wearing of a special apparatus or the like. However, it can be concluded that implementation thereof is quite difficult due to: a drawback of visibility that an object screen is covered with the hand itself in use of an operation; and a drawback that two operational steps from "selection" to "determination" are not clearly distinguished.

Embodiments have been produced in view of the above drawbacks, and may, when an operator performs an operation while being faced to a display, enable accurate determination with respect to motion input, such determination having a lower probability of occurrence of erroneous recognition and with less burden imposed on the operator even in a long duration operation than may otherwise be possible.

Embodiments may include a display that includes display means for displaying an image to be viewed by an operator; one or more imaging devices that may include imaging means for generating a set of data regarding an image of the operator, the imaging devices being disposed in a vicinity of the display while being faced to the operator; one or more area setting components that may include area setting means for preliminarily setting a control area to enable a part of the operator to control a predetermined indicator displayed on the display; one or more control components that may include control means for extracting the part of the operator from the image of the operator and for moving the indicator in accordance with a positional relation between the part of the operator and the display when the part of the operator is located within the set control area; and one or more operation determining components that may include operation determining means for extracting the part of the operator from the image of the operator and determining whether an operation related to a position of the indicator on a display surface of the display has been executed in accordance with a motion of the part of the operator within the set determination area.

In certain embodiments, the area setting components that may preliminarily set a determination area for determining whether the operation related to the position of the indicator on the display surface of a display means has been executed; and the control area is defined by the image of the operator read by the imaging devices.

In certain embodiments, the control area and the determination area may be located right and left or vice versa of the operator; and the part of the operator to be extracted by the control range setting means and the part of the operator to be extracted by the operation determining components may be different from each other.

In certain embodiments, the area setting means may extract a face of the operator from the read image and defines a center of the operator.

In certain embodiments, the operation determining components may define in which of the right and left positions each of the control area and the determination area should be disposed based on a series of predefined motions of the operator read by the imaging means.

In certain embodiments, the area setting means may preliminarily set the control area and the determination area based on a series of predefined motions of the operator read by the imaging means.

In certain embodiments, the area setting means may preliminarily set the determination area and the control area so as not to be overlapped with each other.

In certain embodiments, the control area and the determination area may be areas not interfering with an area defined by connecting a point-of-sight of the operator and respective apices of the display surface of the display means.

Embodiments may include display means for displaying an image to be viewed by an operator; and imaging means for generating a set of data regarding an image of the operator watching the display means, the imaging means disposed in a vicinity of the display means while being faced to the operator of the display means. Furthermore, certain embodiments may include an area setting step of preliminarily setting a control area to enable a part of the operator to control a predetermined indicator displayed on the display means; a control step of extracting the part of the operator from the image of the operator and of moving the indicator in accordance with a positional relation between the part of the operator and the display means when the part of the operator is located within the set control area; and an operation determining step of extracting the part of the operator from the image of the operator and of determining whether an operation related to a position of the indicator on a display surface of the display means has been executed in accordance with a motion of the part of the operator within the set determination area.

Embodiments may include display means for displaying an image to be viewed by an operator; and imaging means for generating a set of data regarding an image of the operator watching the display means. The imaging means may be disposed in a vicinity of the display means while being faced to the operator of the display means. Furthermore, certain embodiments may include an area setting step of preliminarily setting a control area to enable a part of the operator to control a predetermined indicator displayed on the display means; a control step of extracting the part of the operator from the image of the operator and of moving the indicator in accordance with a positional relation between the part of the operator and the display means when the part of the operator is located within the set control area; and an operation determining step of extracting the part of the operator from the image of the operator and of determining whether an operation related to a position of the indicator on a display surface of the display means has been executed in accordance with a motion of the part of the operator within the set determination area.

In certain embodiments, the area setting means may preliminarily set a control area including a range indicated by a series of predefined motions of the operator read by the imaging means, the control area being an area not interfering with an area defined by connecting a point-of-sight of the operator and respective apices of the display surface of the display means.

In certain embodiments, the imaging means may be a three-dimensional imaging means for generating a set of data regarding a stereo image of the operator; the control range setting means may preliminarily set a position determining surface associated with the display surface of the display means as the control range based on the series of predefined motions of the operator read by the imaging means so that the position determining surface is not overlapped with the area defined by connecting the point-of-sight of the operator and the respective apices of the display surface of the display means; and the control means may move the indicator to a position on the display surface corresponding to a position of the part of the operator on the set position determining surface.

In certain embodiments, the position determining surface may be formed between the display means and the operator.

In certain embodiments, an operation determining component may extract another part different from the part of the operator from the image of the operator, and based on a series of motions of said another part different from the part of the operator, may determine that a predefined operation associated with the series of motions of said another part has been executed.

Certain embodiments may include determination area setting means for preliminarily setting a determination area as an area to enable said another part different from the part of the operator to execute determination based on the series of predefined motions of the operator read by the imaging means. When said another part, different from the part of the operator, is located within the set determination area, based on the series of motions of said another part different from the part of the operator, the operation determining components may determine that the predefined operation associated with the series of motions of said another part has been executed.

In certain embodiments, the imaging means may be a three-dimensional imaging means for generating a set of data regarding a stereo image of the operator. The determination area setting means may preliminarily set an operation determining surface associated with the display surface of the display means as the determination area based on the series of predefined motions of the operator read by the imaging means so that the operation determining surface may avoid being overlapped with the control range without interfering with an exclusion area defined by connecting the point-of-sight of the operator and the respective apices of the display surface of the display means. The operation determining components may extract said another part different from the part of the operator from the image of the operator and may determine that the operation associated with the series of motions has been executed when said another part different from the part of the operator is located between the set operation determining surface and the display means.

In certain embodiments, the operation determining surface may be formed between the display means and the operator.

Certain embodiments may include determination range setting means for preliminarily setting a determination area as an area to enable another part different from the part of the operator to determine an area that is indicated by the series of predefined motions of the operator read by the imaging means and is not overlapped with the position determining surface without interfering with the area defined by connecting the point-of-sight of the operator and the respective apices of the display surface of the display means. The operation determining components may extract said another part different from the part of the operator from the image of the operator; and when said another part different from the part of the operator is located within the set determination area, based on a series of motions of said another part different from the part of the operator, may determine that a predefined operation associated with the series of motions of said another part has been executed.

In certain embodiments, the determination area setting means may preliminarily set an operation determining surface associated with the display surface of the display means as the determination area based on the series of predefined motions of the operator read by the imaging means so that the operation determining surface is not overlapped with the control range without interfering with an exclusion area defined by connecting the point-of-sight of the operator and the respective apices of the display surface of the display means. The operation determining components may extract said another part different from the part of the operator from the image of the operator and may determine that an operation associated with the series of motions has been executed when said another part different from the part of the operator is located between the set operation determining surface and the display means.

In certain embodiments, the operation determining surface may be formed between the display means and the operator.

In certain embodiments, a position for moving the indicator may be indicated by calculating a distance of the position determining surface from the operator based on a positional relation between the part of the operator and the position determining surface and by changing the indicator in accordance with the distance.

In certain embodiments, the determination area setting means may set two or more virtual operation layers to be defined as the determination area based on a positional relation with the operation determining surface. When said another part different from the part of the operator is read within any of the two or more virtual operation layers, the operation determining components may determine a content of the operation based on an operational type preliminarily allocated to the relevant virtual operation layer and the series of motions of said another part different from the part of the operator within the relevant virtual operation layer.

Certain embodiments may include voice recognizing means for recognizing a voice of the operator, such that when a voice recognized by the voice means is a predefined voice, the operation determining components may determine that an operation corresponding to the predefined voice has been executed.

In certain embodiments, the imaging means may be formed by single imaging means of the display means.

In certain embodiments, the imaging means may be formed by two imaging means respectively disposed on right and left of the display means, such that the two imaging means may respectively take an image of the part of the operator and an image of another part different from the part of the operator.

In certain embodiments the part of the operator may be a hand of the operator.

In certain embodiments, the part of the operator may be one of the hands of the operator, and the other part that is different from the part of the operator may be the other of the hands of the operator.

DESCRIPTION OF EMBODIMENTS

Various embodiments are described below with reference to the drawings.

Figure 1:
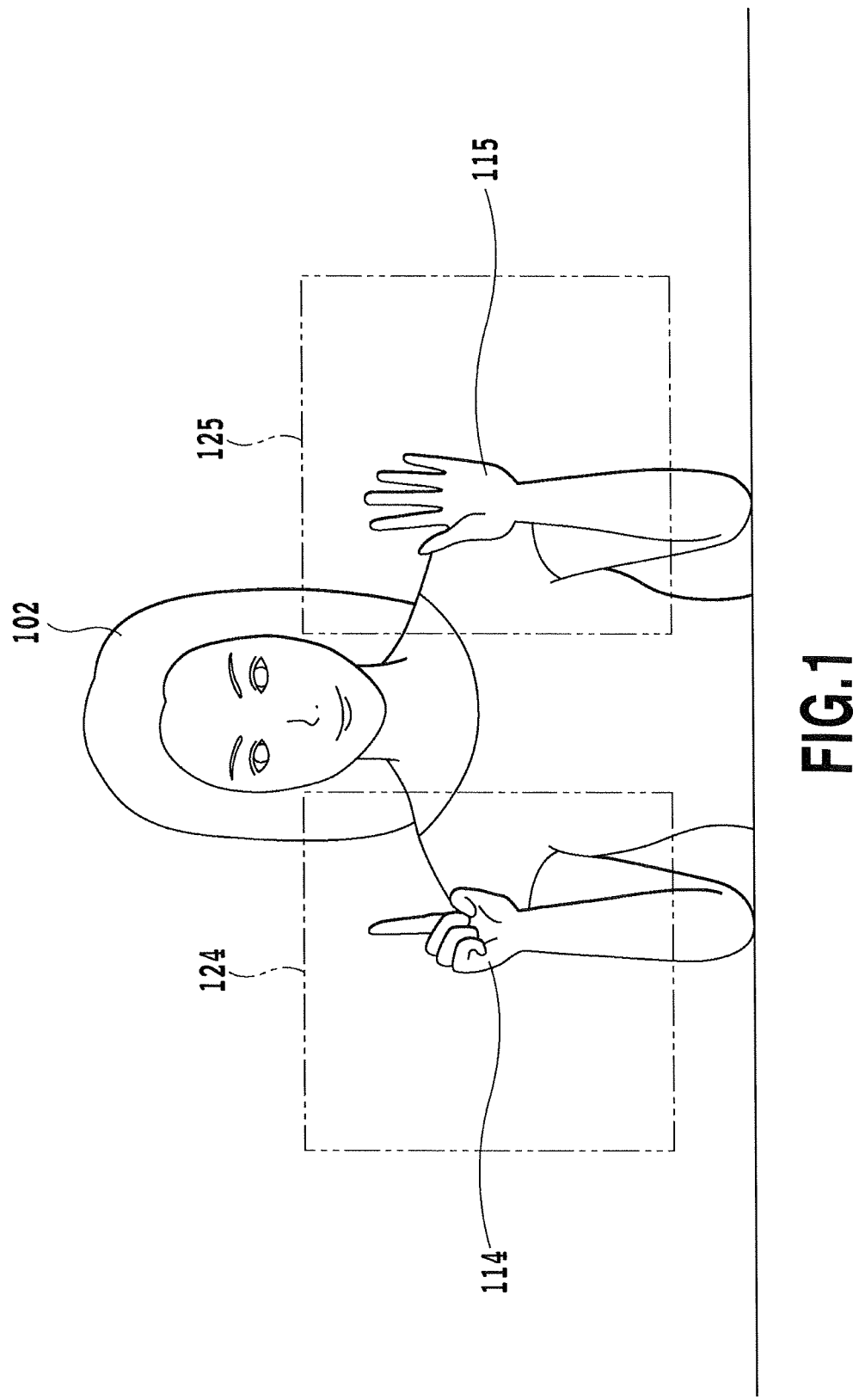
FIG. 1 depicts an example of an operation input system according to an embodiment.

FIG. 1 is a diagram showing an example of an operation input system. In the illustrated embodiment, as described below, a right side area 124 and a left side area 125 are respectively defined as an operation area for a right hand 114 and that for a left hand 115 with reference to the head of an operator 102, and respective operation contents are determined and processed as operation inputs. As is understandable with reference to FIG. 1, through the arrangement of the right side area 124 and the left side area 125 at a certain distance, such an arrangement may prevent motions of the right hand 114 and the left hand 115 of the operator being conflated and/or erroneously recognized.

Figure 20:
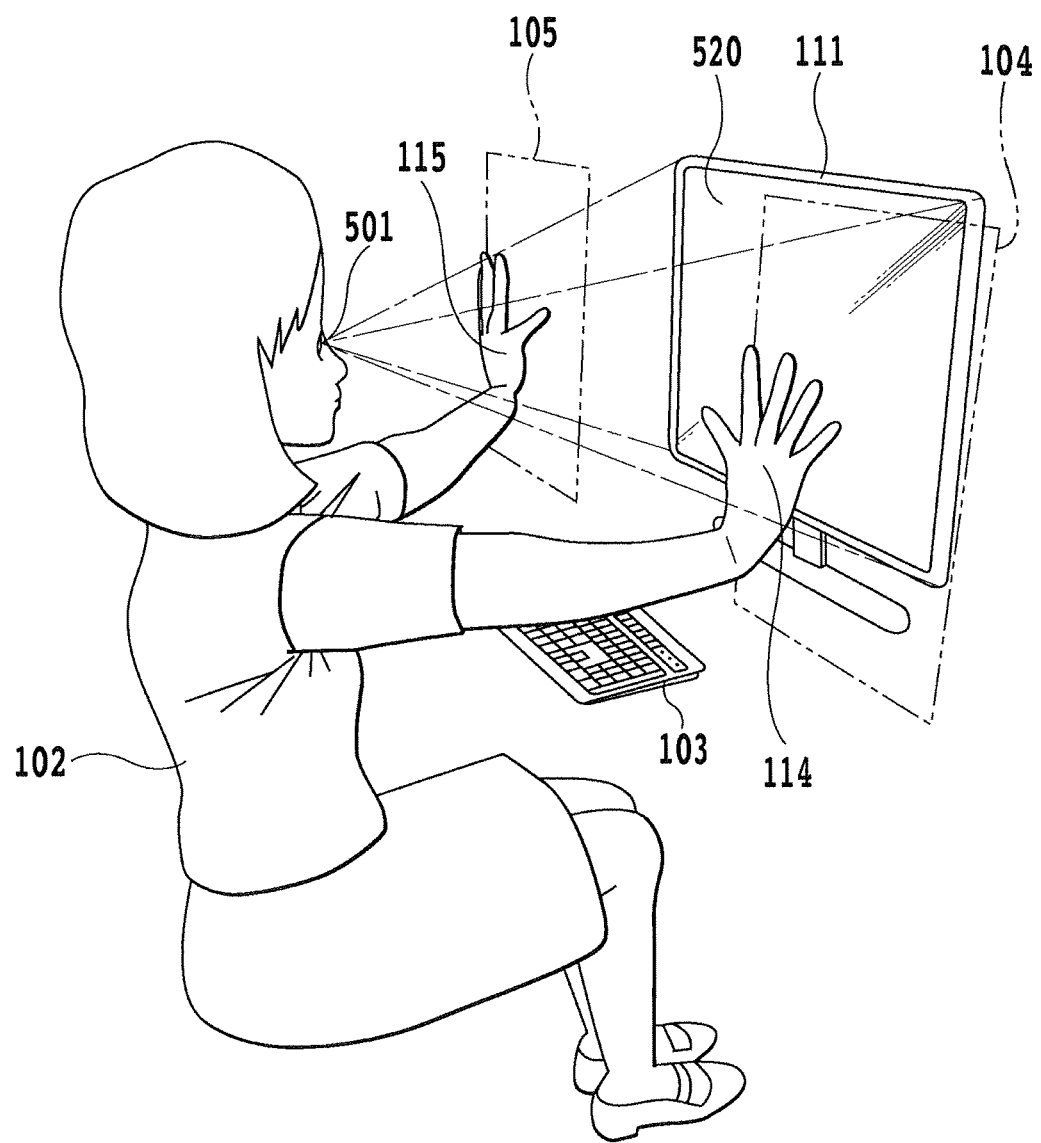
FIG. 20 is a diagram showing an example of an operation input system according to an embodiment.

By thus defining the two areas, in at least certain embodiments different types of operations may be performed with the right hand 114 and the left hand 115 in face of a display 111 as shown in FIG. 20, and thereby, operational determination is more efficiently enabled. For example, in the illustrated embodiment, a configuration is enabled that a cursor is moved by the right hand 114 and an operational content is settled with the left hand 115 (corresponding to a click press of a mouse). However, without being limited to this, various operations can be combined.

In the illustrated embodiment, the display 111 is disposed in front of the operator 102, and the operator 102 can perform an operation within the areas set in certain right and left positions between the operator 102 and the display 111 while being conscious of that the shape of a finger or the like is handled as an object for operational determination. Here, the display 111 displays various video images for various applications to be normally used in a personal computer. In addition to this, through the support for an operation input, i.e., displaying a body part of the operator 102 or the like as an object on a corner part of the screen, for instance, the display 111 can display for the operator 102 recognition by the system regarding what kind of operation is performed at this point of time. In at least some embodiments, a normal display for a personal computer can be used as the monitor to be viewed by the operator. Furthermore, the illustrated embodiment will be explained using the system that positional determination is executed by the right hand while operational determination is executed by the left hand. However, in at least some embodiments, the right and left configuration can be also reversed in accordance with the dominant hand, preference or the like of the operator.

Figure 5:
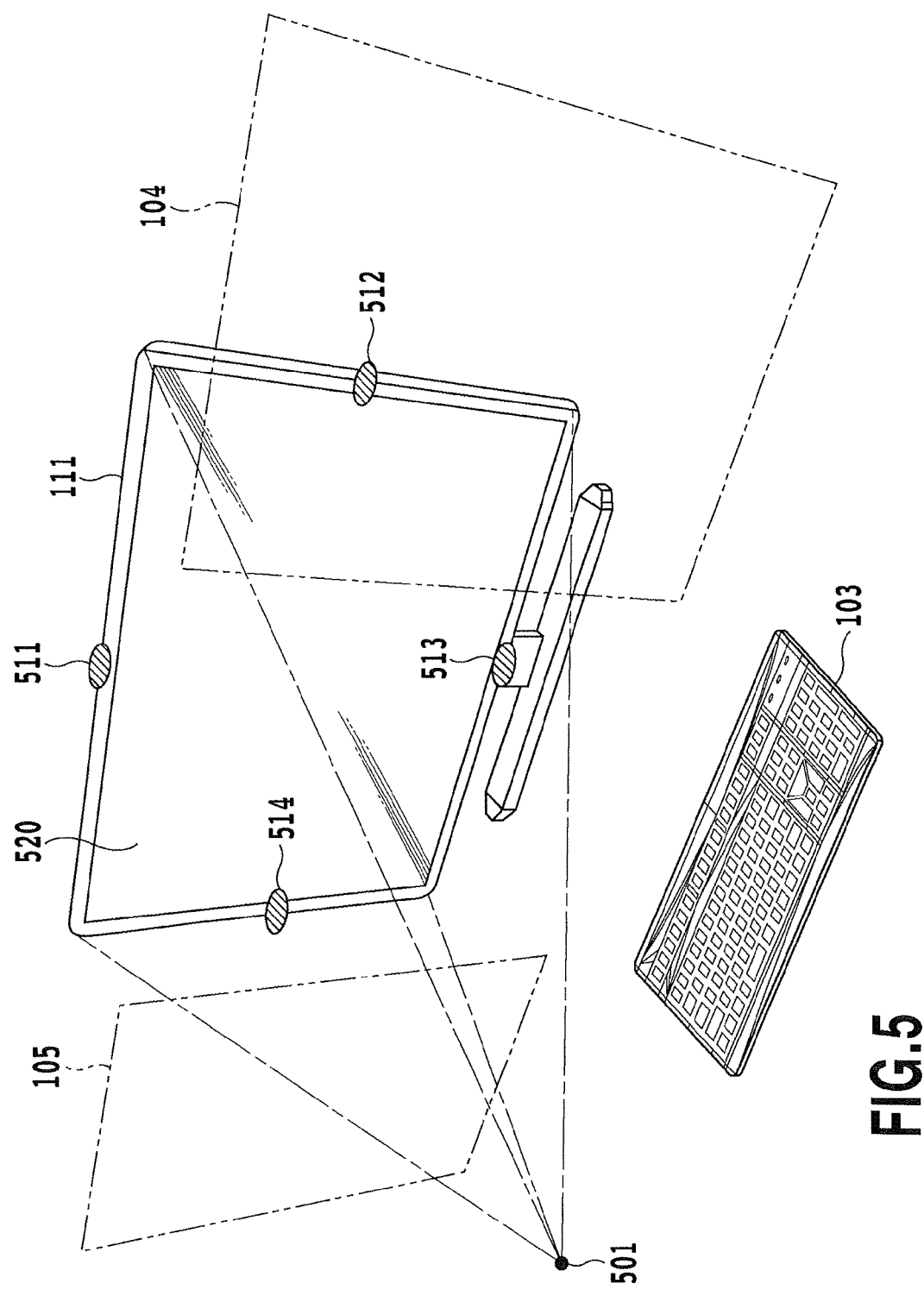
FIG. 5 depicts right and left operation areas according to an embodiment.

In the illustrated embodiment, any camera may be used among video cameras 511 to 514 positioned as shown in FIG. 5 in order to obtain an image. For example, although FIG. 5 shows four cameras, but any number of cameras may be mounted. When multiple cameras are used, it is also possible to enhance accuracy in an image by separately shooting the motions of the right and left hands with the right and left cameras. Furthermore, it is also possible to use, as the camera, any imaging means known in the field of the present art, such as an infrared camera. Furthermore, any places in the vicinity of the monitor may be used as camera installation places, and such installation places are not limited to the four positions as shown in FIG. 5. Therefore, the camera 511 and/or the like may be of any type as long as they can shoot an image of an object and the methods thereof are not limited. In the illustrated embodiment, the cameras are selected to obtain a wide angular range.

In at least some embodiments, it is possible to use a low-cost web camera and/or the like that have been used for personal computers and the like in recent years. Where low-cost web cameras are used instead of high-cost cameras and are respectively disposed on the both ends of an object screen similarly to the cameras 512 and 514, accuracy in sensing can be also enhanced by a method of causing the right and left cameras to be independently in charge of sensing of the right operation and that of the left operation as described above. In this case, a PC operation is enabled in the form of a two-stage operation by a method known in the field of the present art such as a method of executing cursor moving (recognition of an image of a fingertip) by the dominant arm and decision making through contour image recognition of a gesture of the other arm based on the obtained piece of two-dimensional image information.

Figure 19:
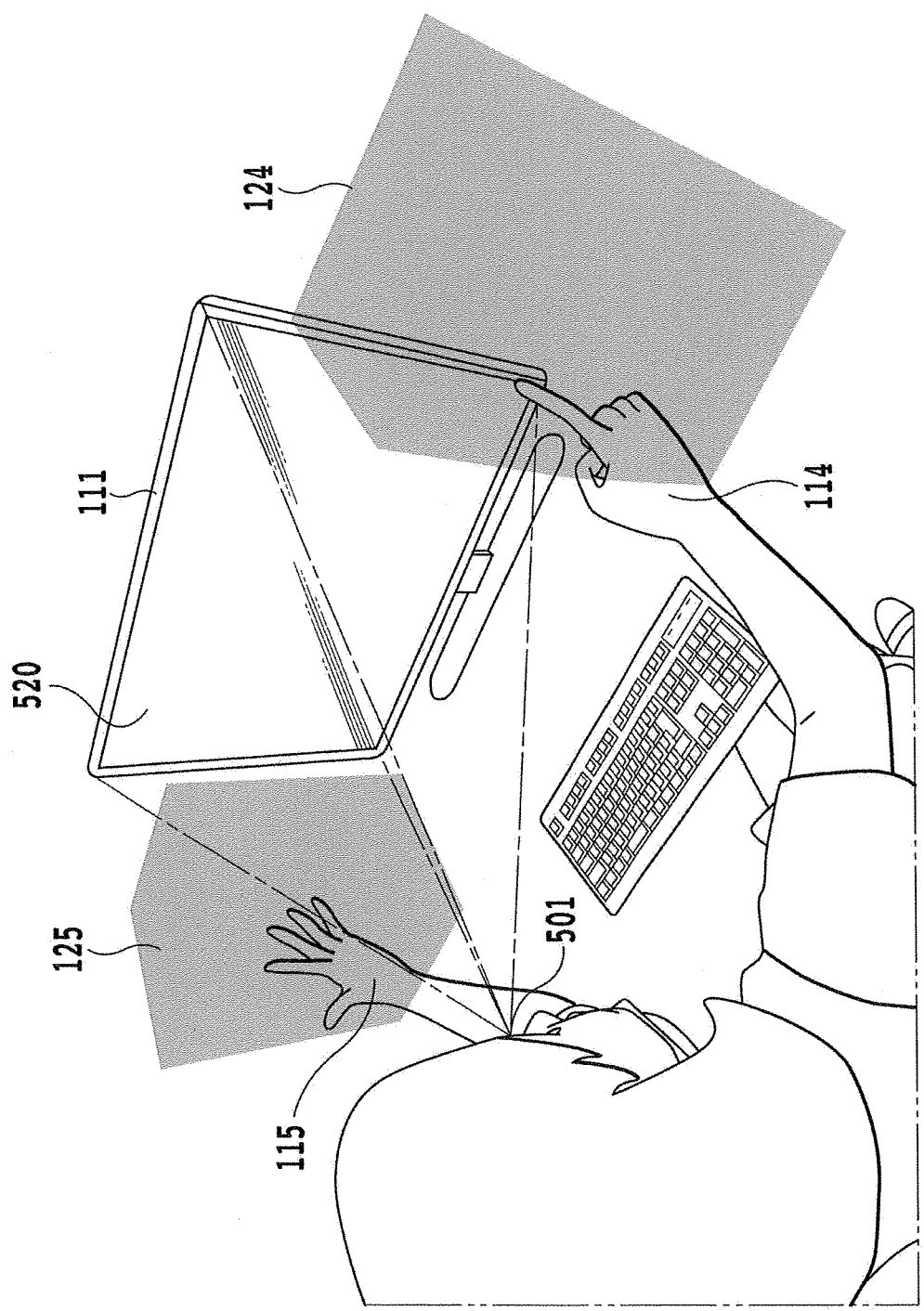
FIG. 19 is a diagram showing an example of an operation input system according to an embodiment.

With reference to FIG. 19, an operation input method will be described. In the illustrated embodiment, the hands are typically moved within the aforementioned areas 124 and 125 separated right and left through a considerably large buffer area i.e., a square pyramid connecting a point-of-sight 501 and the four corners of an operation object screen 520. Therefore, it is possible to reliably achieve visibility in a normal operation of a personal computer without blocking the screen displayed on the display 111 even when the operator moves the hands in operational input motions. Here, it is also possible to form the buffer area in any size unless the right and left hands are conflated. Furthermore, the right and left areas 124 and 125 for hand motions are similarly arranged while being divided through the aforementioned buffer area. Therefore, determination is enabled regarding motions in the respective areas, while motions by the right hand and the left hand of the operator can be accurately distinguished from each other. In this manner, it is possible to respectively limit and distinguish the operation areas of the right and left hands divided by an operation area setting of the operator or through the center non-sensing area, and thereby, a stable operation can be supposed to be implemented.

In at least one embodiment, one of the right and left hands is used only for a function of pointing or focusing (corresponding to conventional cursor moving using a mouse) in an XY coordinate (a virtual trackpad function), whereas the other hand is used only for a function of receiving a trigger of a determination motion with respect to focusing such as a click, a double-click or a drag. Thus, it is possible to reduce erroneous input and/or erroneous recognition often found out in gesture operations by assigning completely different functions to the right and left hands and by determining the operation in two stages. The following non-exclusive list may be employed as specific gestures: opening the palm (the shape of paper in rock-paper-scissors) for "a click, double-click operation"; sticking up the index finger for a click; sticking up two fingers for a double-click; and the like. It should be noted that in the following explanation, for the sake of convenience, the right hand is used for a virtual trackpad function, whereas the left hand is used for an operation determining function. However, in certain embodiments, the right and left configuration can be reversed, and further, the functions can be divided or integrated.

Figure 2:
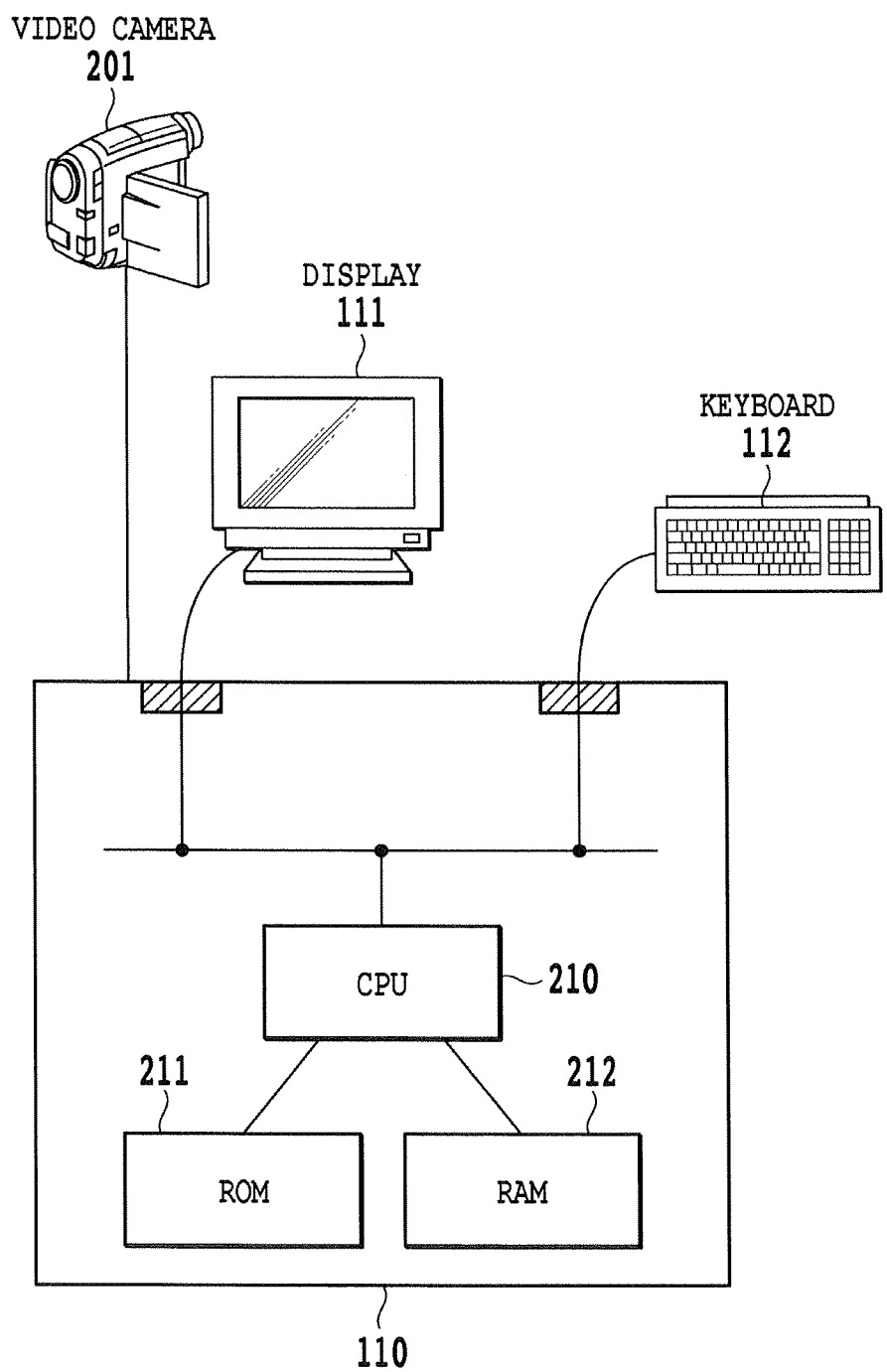
FIG. 2 is a block diagram illustrating a relation between a computer and an operation input system according to an embodiment.

FIG. 2 is a block diagram schematically showing a structure of a computer 110 as an operation input apparatus of the present embodiment. In the illustrated embodiment, the video camera 511 and/or the like, which are attached to the display 111 and shoot the operator 102 or the like, are connected to the computer 110 and loads the shot images to the computer 110. In a CPU 210, images of the right and left hands as a part of the operator characterized in the present embodiment are extracted from the image obtained by shooting. In general, the computer 110 includes the CPU 210, runs on a RAM 212 a program stored in a ROM 211 or the like, and outputs a processing result based on the image inputted from the operation input apparatus to the display 111 or the like. In the illustrated embodiment, the display 111 can output various video images to be provided by various applications that the operator tries to experience as well as the aforementioned icons to be displayed by the motions of the hands of the operator, and also displays such information as support for an operational input as described below.

Figure 21:
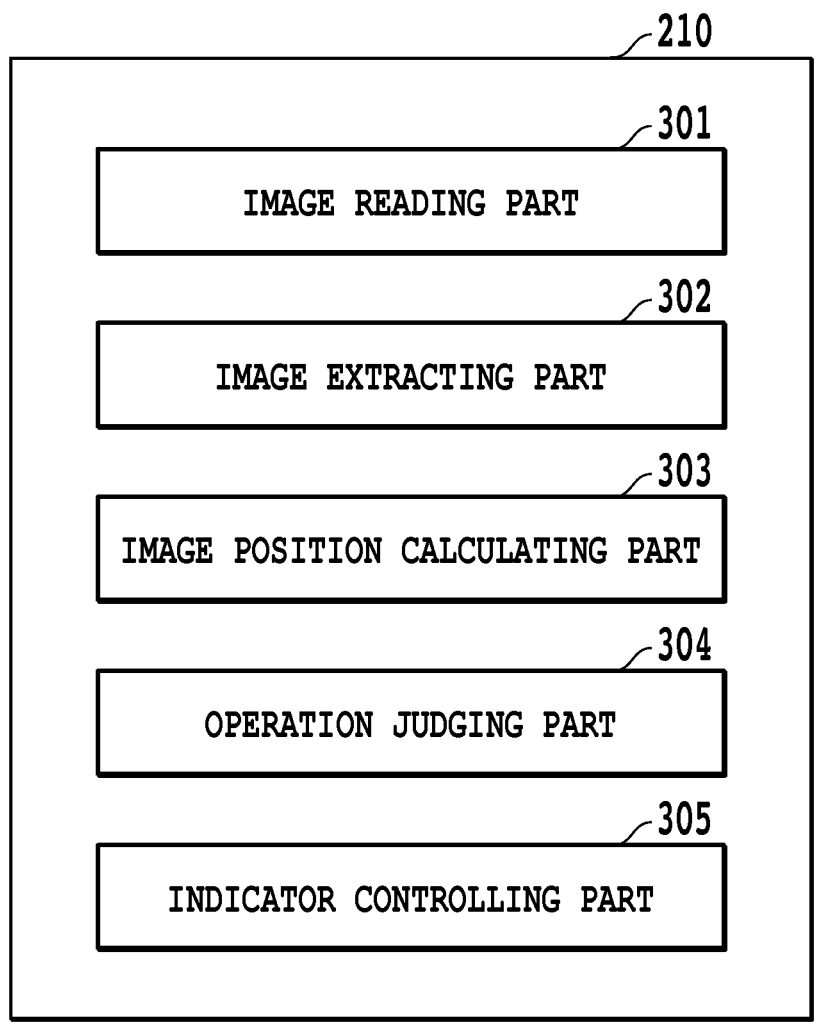
FIG. 21 is a block diagram showing an example of a function module of a program to be processed within a CPU of the computer according to an embodiment.

FIG. 21 is a block diagram showing an example of function modules of a program to be processed within the CPU 210 of the computer 110 according to at least one embodiment. As shown in FIG. 21, the processing in the depicted system is executed by an image reading part 301, an image extracting part 302, an image position calculating part 303, an operation determining part 304 and an indicator controlling part 305. In the illustrated embodiment, a series of processing from receipt of an image from the video camera 511 to output of a set of data is executed by the five modules. In other embodiments, the processing may be executed using another module or fewer modules.

In the illustrated embodiment, an icon may be displayed using a 3D display enabling stereo display as the display 111 so that the icon appears to exist in a position that an operation surface is set or adjusted seen from the operator 102. Accordingly, the operator 102 can recognize the icon or the like as a stereo video image as if the icon or the like existed therein, and can perform an operation with respect to the recognized stereo video image using hands and fingers. The operator 102 watches an image, an icon or the like displayed on the display 111 with right and left eyes thereof. On the other hand, the icon or the like is formed by, for instance, two images including disparity for a stereo display purpose thereof. When the two images are respectively watched by the right and left eyes, such a surface can be formed that is stereo-displayed out of the display 111 as if the surface was located in front of the operator. In at least some embodiments, the position of the stereo-displayed surface may be displayed in a position slightly different from the position in which the icon or the like is actually formed. However, it may not be necessarily matched with the position in which the icon or the like is actually formed.

Figure 3:
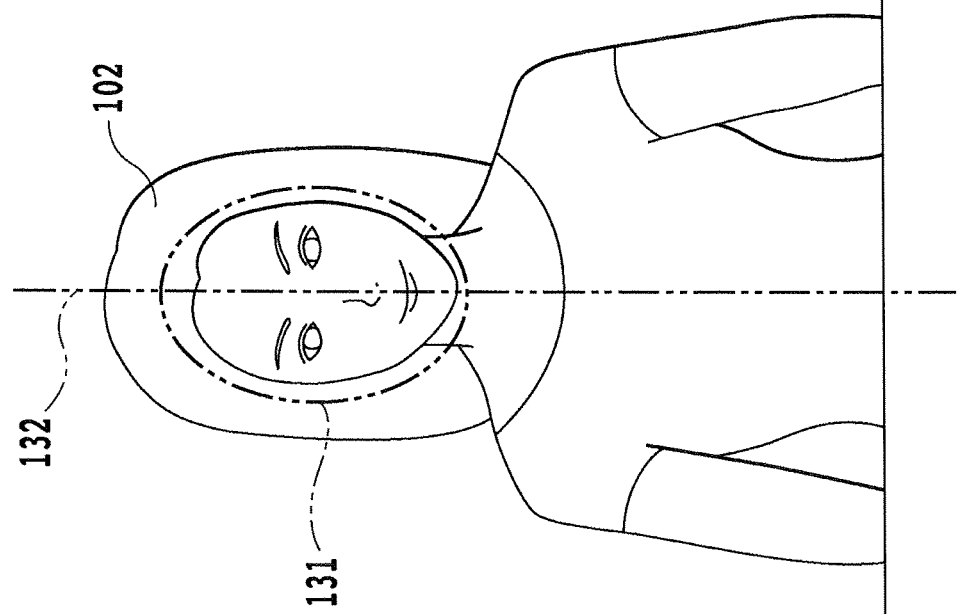
FIG. 3 illustrates a principle of the present embodiment.
Figure 6:
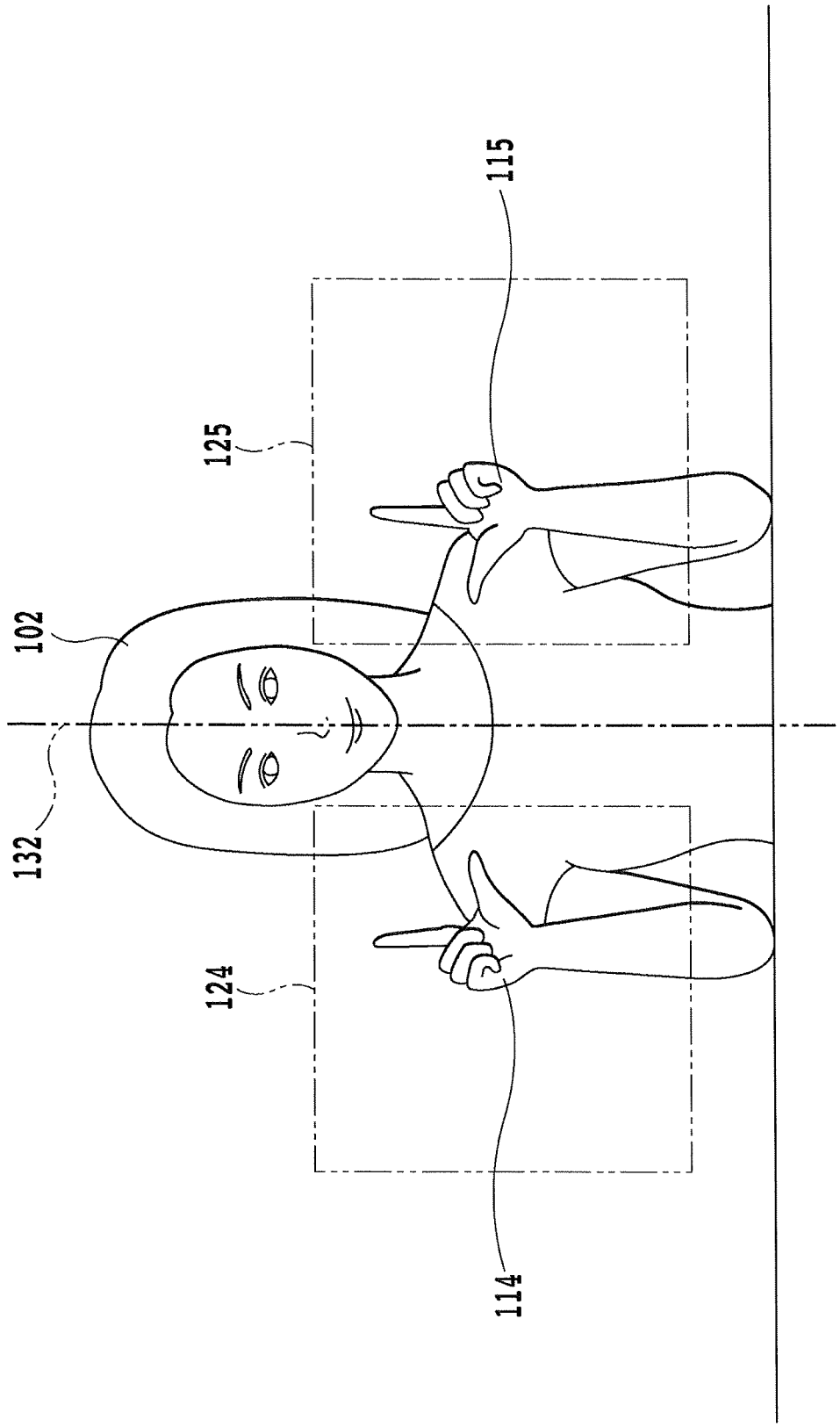
FIG. 6 is a diagram illustrating various roles of the right and left operation areas according to an embodiment.

FIG. 3 is a diagram for explaining a processing of setting operation areas according to at least one embodiment. In the illustrated embodiment, to more easily set the right and left operation areas, a face 131 is extracted from the image of the operator shot by the aforementioned video camera 111 and is used as a reference in setting the right and left areas. After the face 131 of the operator 102 is extracted by a method known in the field of the present art, the center part of the face is determined and a perpendicular passing through the center part is determined as a center line 132 of the operator 102. The right and left operation areas 124 and 125 are set where a certain buffer area, not functioning as even either of the operation areas, is provided right and left of the center line. In this way, the right side area 124 and the left side area 125 can be more easily defined with reference to the center line 132 as shown in FIG. 6. However, the size and the position of each operation area are set to have appropriate values in accordance with the system, the body shape of the operator and/or the like. Similarly, the buffer area is also set to have an appropriate size in accordance with the extent of confusion of the motions of the right and left hands. In the illustrated embodiment, the face is extracted. In certain embodiments, however, the head or other part of the operator in the vicinity of the head may be set as a reference.

In at least some embodiments, such processing of setting effective motion ranges may be started after the system is powered on or through a specific operation such as an instruction using a remote controller. In other embodiments, it may be started at any timing by any of the methods known in the field of the present art.

Figure 18:
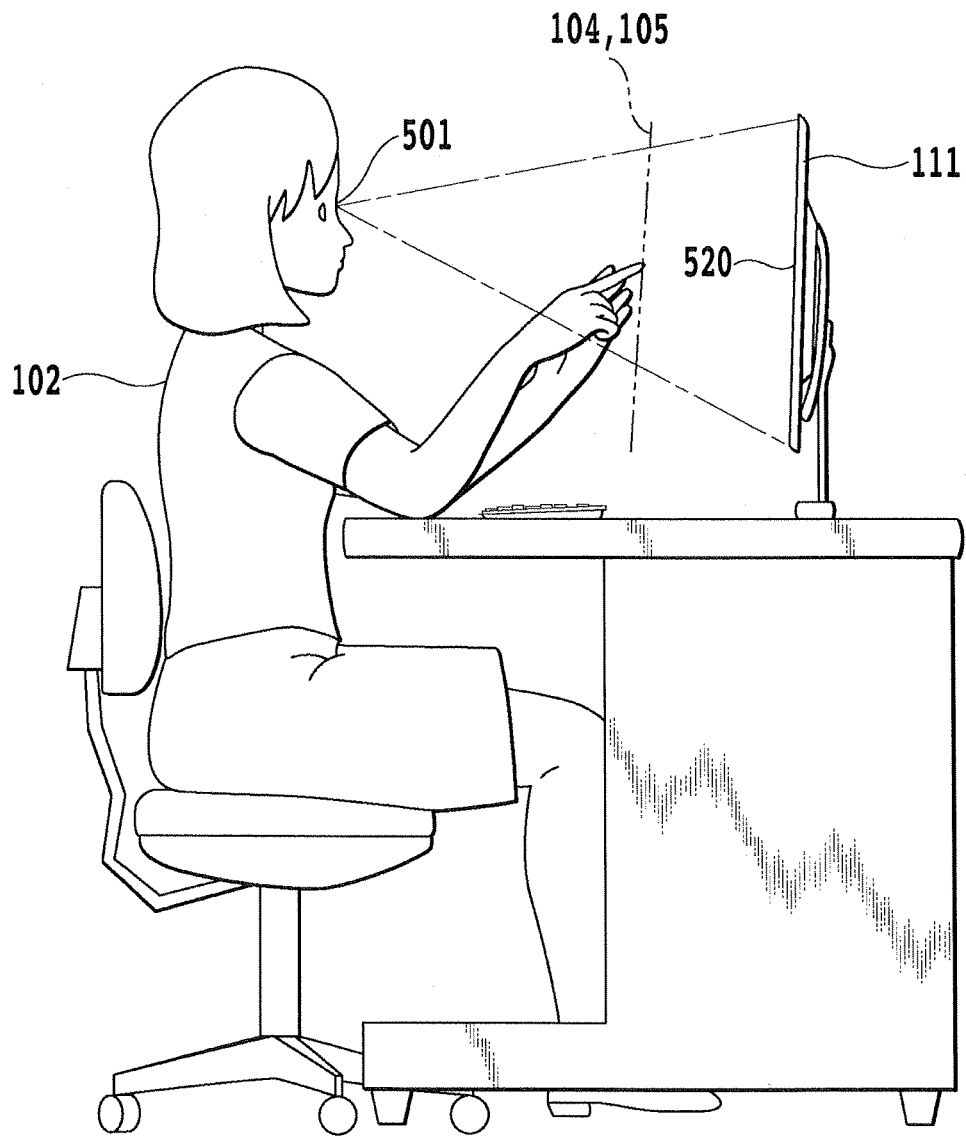
FIG. 18 is a diagram showing an example of an operation posture in an operation input system according to an embodiment.

In at least some embodiments, gesture input while both elbows are rested on the desk surface may be used for gesture input in a typical PC operation as shown in FIG. 18. Therefore, in setting motion ranges, it is useful to set the motion ranges in suitable positions for the operator's body in consideration of such operation posture. Such operation posture, with both elbows rested on the desk surface, may be beneficial in that the physical load is remarkably reduced than the case of a mouse and/or a keyboard in a conventional PC operation.

For example, such benefits may include: reduction in muscle load on the both shoulders attributed to the weight of the both arms; an ability to recognize a small gesture operation; and that a mouse and a keyboard can be replaced by a single camera. In addition, with both elbows rested on desk surface, stable gesture positions may be constantly and reliably obtained even in executing cursor moving (focusing) by the right hand 114 and operational determination by the left hand 115.

In at least some embodiments, when it is assumed that the operation input apparatus of the present embodiment is installed anew, for instance, as the premise for executing the aforementioned operation range setting processing, it may be useful to execute an initial setting known as preliminary preparation, i.e., to preliminarily input into the apparatus pieces of information including distortion of a lens used for the video camera 511 to be used, distance between the display 111 and the lens and the like. Furthermore, threshold settings and the like may be preliminarily adjusted.

Figure 24:
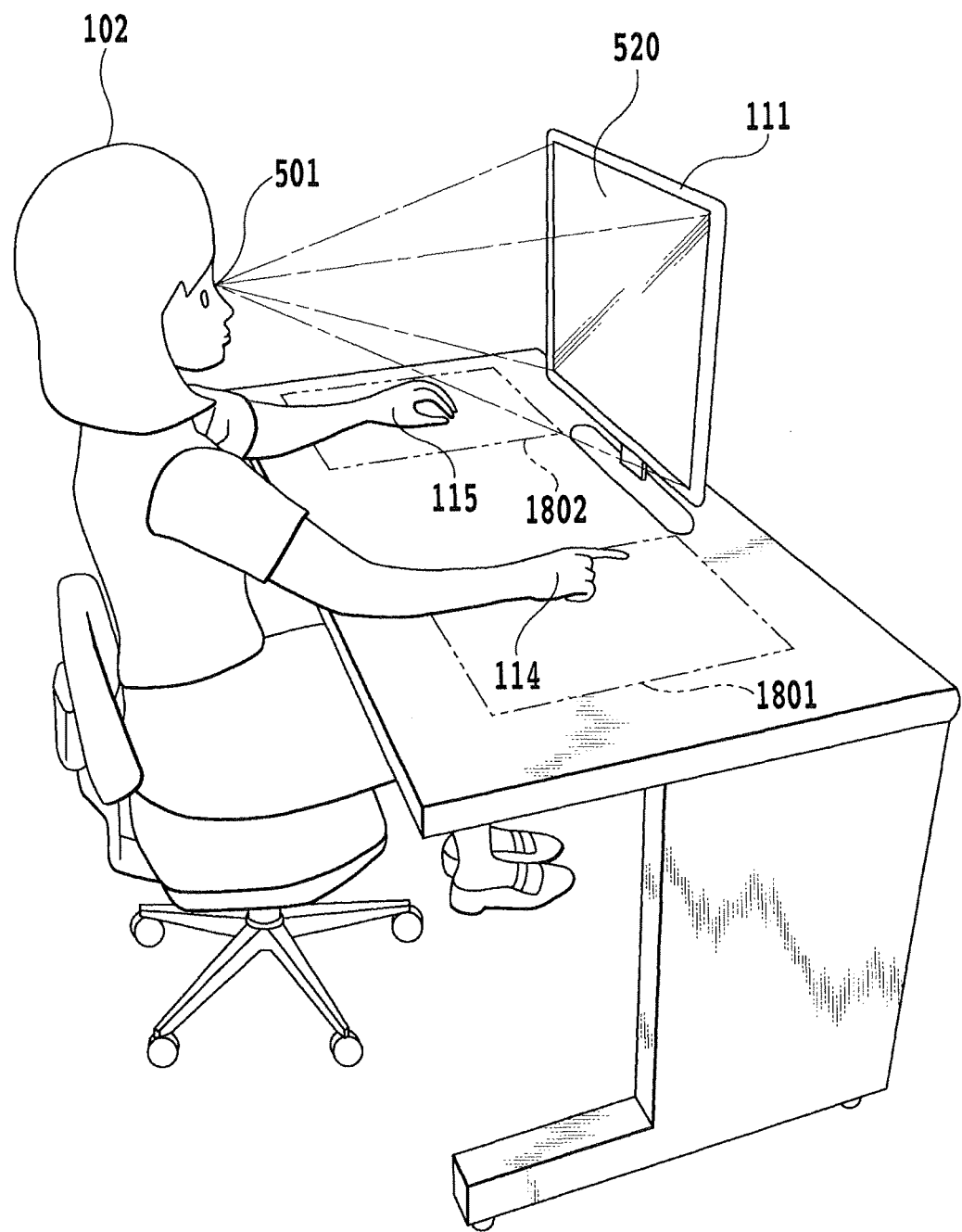
FIG. 24 is a diagram showing another example of an operation input system in accordance with an embodiment.

Further, as shown in FIG. 24, it is also possible to set spaces on and above the desk as effective motion ranges. In short, it can be configured that an icon is moved by moving the right hand 114 on or above the desk, whereas the left hand 115 is normally positioned above the desk and is determined to perform an operation when touching the desk surface.

Figure 4:
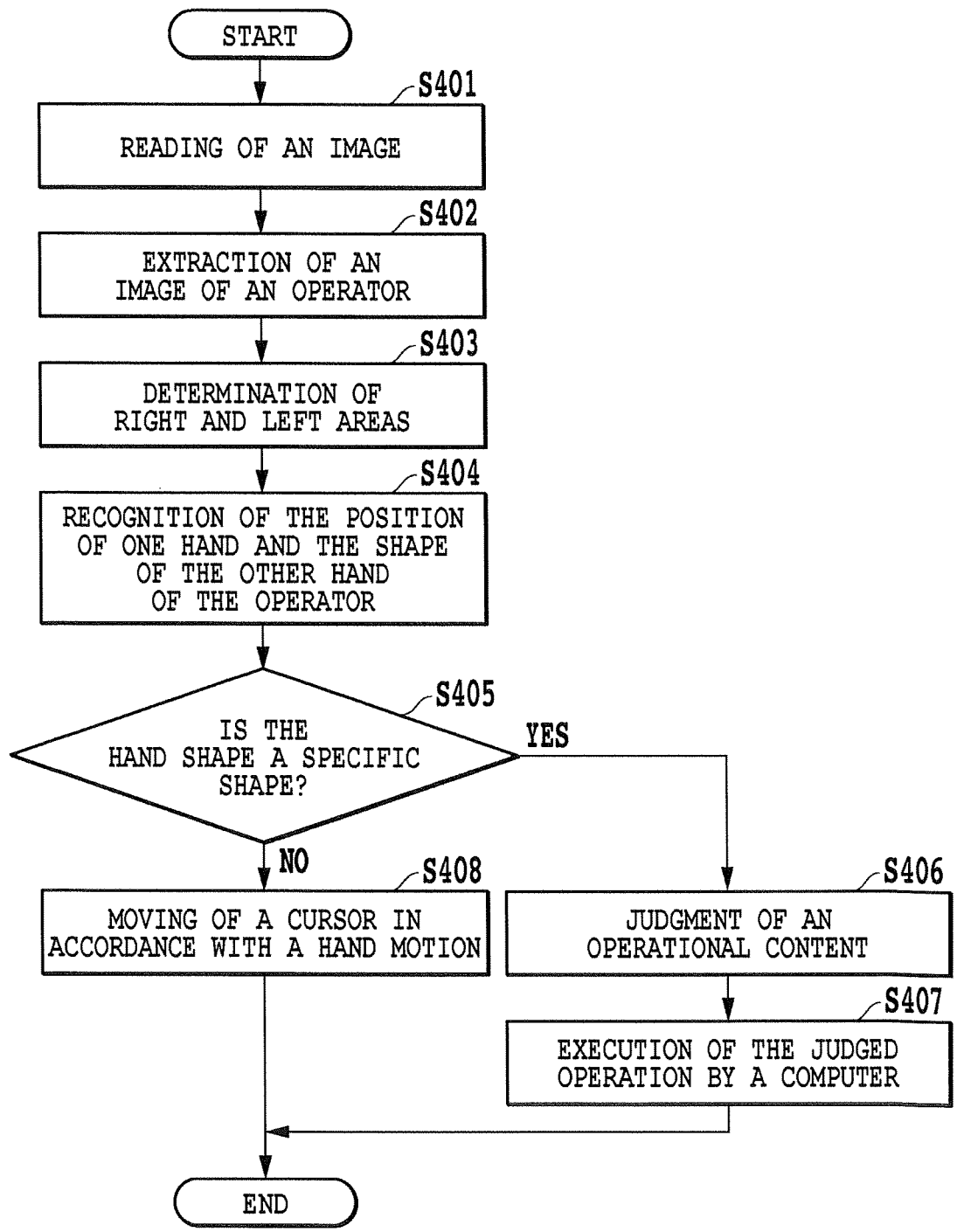
FIG. 4 is a flowchart depicting one process in accordance with an embodiment.

In at least the illustrated embodiment of FIGS. 4 and 19, positions may be defined for the hands or fingers 114 and 115 as a part of the operator 102 shot by the video camera 511 and/or the like. Further, based on relative positions between these positions and their corresponding points on the display and/or the shape thereby formed, an icon on the display is moved and it is determined that a certain operation is performed. Firstly, the image reading part 301 reads a set of data shot by the video camera 511 and/or the like, and the image extracting part 302 extracts images of the hands of the operation from the set of data (S401 and 402).

As a result of such preparation, the positions and the sizes of the effective motion areas 124 and 125 are loaded, which have been preliminarily set in the aforementioned setting of the operation areas (S403) and have been stored in the storage means or the like. Here, an operation starting position of the right hand has been herein suitably set, and with any of the methods known in the field of the present art, an icon or the like is displayed by the indicator controlling part 305 in a position on the display 111 corresponding to the position of the right hand 114 while being controlled to be moved in accordance with the motion of the hand. Thus, in at least some embodiments, the operator can execute operations such as an operation of moving the icon displayed on the display surface by properly moving the finger and the hand within the effective motion area 124 in accordance with the motion of the displayed icon (S404, 405 and 408).

The operation determining part 304 determines that a predefined operation was executed based on the shape or motion of the left hand 115 of the operator 102 within the motion area 125, and informs the system that the operation was executed based on the position of the right hand 114 as well as of the operational content predefined in association with the shape and/or motion of the left hand (S406 and 407).

Here, it is possible to determine which shape or motion corresponds to which operation either uniquely by the system or by employing any of the methods known in the present art. Alternatively, it is possible to determine that the position was only touched by the operator, for instance, that an icon was selected or that a button was pushed. As a result, it is determined that such operation input was executed and the operation is executed by the computer 110. Determination of the operational content is not limited to be executed with the method herein explained, and any of the methods known in the present embodiment can be used. Further, although description of a specific determination method has been also omitted, in certain embodiments, the database or the like has preliminarily stored the shape or motion of the body of the operator such as a predefined gesture and the operational content thereby expressed. After extraction of the image, the database is accessed and the operational content is determined. In this case, it is also obvious that determination accuracy can be also enhanced by utilizing an image recognition technology, artificial intelligence and/or the like with a method known in the field of the present art. Here, when the hands are not positioned in the effective motion areas 124 and 125, it is not determined that an operation was executed. For example, when the right hand is out of the effective area 124, the icon is either stopped at the position or returned to its initial position. On the other hand, when the left hand is out of the effective area 125, it is not determined that an operation was executed even if the shape and/or motion of the left hand are predefined ones.

As described above, according to at least some embodiments, the right and left motion areas 124 and 125 are defined with reference to the head or the like of the operator, and different functions, for instance, moving or selection of an icon and an operational content such as a click or a drag, are separately executed by the right and left hands. Accordingly, in spite of an input only by a gesture, without burdening the operator, an accurate operation input is enabled in a personal computer or the like without using a keyboard.

As described above, in certain embodiments, a method of defining the right and left operation areas with reference to the center line of the operator has been explained amongst operation input methods that hands are moved while functions are divided into right and left areas in a space between the operator and the display. In other embodiments, operation areas are configured to be defined using substantially the same system configuration based on the position, the motion or the like of a hand or the like of an operator such as a gesture without considering the center line. Further, in certain embodiments, an operation may be determined while the right and left hands are respectively moved in certain right and left ranges seen from the display. In other embodiments, a configuration of moving the hands in positional ranges naturally reachable by the hands can be also used for operational determination. For example, it is possible to set various functions such as using as a space key the lower side of a square pyramid formed by the point-of-sight 501 and the display surface 520 shown in FIG. 19.

In the operation input method of the embodiment illustrated in FIG. 19, an operation in the present embodiment is handled as an operational object when the hands are moved within the areas 124 and 125 separated right and left through the aforementioned square pyramid connecting the point-of-sight 501 and the four corners of the operation object screen 520. Therefore, visibility in a normal personal computer operation can be reliably obtained without blocking the screen displayed on the display 111 even when the operator moves the hands thereof in an operation input motion. In certain embodiments, the right and left areas may be separated using the concept of a buffer area including such square pyramid. However, in the illustrated embodiment of FIG. 19, the arrangement of the right and left areas 124 and 125 for hand motions may be arranged while being divided by the aforementioned square pyramid, and determination may be enabled while a hand of executing a processing and the right hand are accurately distinguished from each other. Thus, in certain embodiments, it becomes possible to respectively limit and distinguish the operation areas of the right and left hands divided by the operation area setting of the operator or through the center non-sensing area, and thereby, a stable operation can be supposed to be implemented.

In at least some embodiments, when it is assumed that the operation input apparatus of the present embodiment is installed anew (for example, as the premise for executing an operation range setting processing) it may be useful to execute an initial setting known in the field of the present art as preliminary preparation, i.e., to preliminarily input into the apparatus pieces of information including distortion of a lens used for the video camera 511 to be used, distance between the display 111 and the lens and the like. Further, threshold settings and the like may be preliminarily adjusted. The processing of the present embodiment is executed when the initial setting is finished for the system. With reference to FIG. 20, explanation will be herein provided for a processing, according to the present embodiment, of setting right and left motion ranges by a gesture of an operator. As with an example shown in FIG. 20, the positions and the sizes of the motion ranges may be determined by the hands 114 and 115 of an image of the operator shot by the camera. Specifically, as shown in FIG. 20, certain ranges, including the positions indicated with the hands 114 and 115 by the operator, may be set as effective motion ranges. FIG. 19 shows ranges 124 and 125 as exemplary motion ranges. Here, to dispose the right and left effective ranges to be divided through the aforementioned square pyramid, a given motion is not handled as an effective motion in a part of the set ranges that interfere with the aforementioned square pyramid, and thereby, such part is excluded from the effective motion ranges.

In certain embodiments, such processing of setting effective motion ranges is started after the system is powered on or through a specific operation such as an instruction using a remote controller. In other embodiments, it may be started at any timing by any of the methods known in the field of the present art.

In at least some embodiments, gesture input with the both elbows being rested on the desk surface is a normal form of gesture input in a normal PC operation as shown in FIG. 18. Therefore, in setting motion ranges, it is useful to set the motion ranges in suitable positions for the operator's body in consideration of such operation posture. In certain embodiments, such operation posture with the both elbows rested on the desk surface may be beneficial in that physical load on the operator may be reduced relative to the case of a mouse and/or a keyboard in a conventional PC operation. For example, a reduction in muscle load on shoulders attributed to the weight of the both arms; an ability to utilize small gesture operations, and the replacement of a mouse and a keyboard with one or more cameras. In addition, with both elbows rested on desk surface, stable gesture positions can be constantly and reliably obtained even in executing cursor moving (focusing) by the right hand 114 and operational determination by the left hand 115.

Further, in the embodiment depicted in FIG. 24, it is also possible to set spaces on and above the desk as effective motion ranges. Thus, it can be configured that an icon is moved by moving the right hand 114 on or above the desk, whereas the left hand 115 is normally positioned above the desk and is determined to perform an operation when touching the desk surface.

As described above, in certain embodiments, the right and left motion areas 124 and 125 may be defined, which may be clearly divided by the field of view of the display screen, i.e., the aforementioned square pyramid, and different functions, for instance, moving or selection of an icon and an operational content such as a click or a drag, may be separately executed by the right and left hands. Accordingly, in spite of an input only by a gesture, without burdening the operator, an accurate operation input is enabled in a personal computer or the like without using a keyboard.

As described above, in certain embodiments, explanation has been provided for operation input such that the hands may be moved while functions are divided into right and left areas in a space between the operator and the display. However, in various embodiments, an operational trigger and an operational content may be determined using the motion of the hand with respect to the operation surface and an area formed by the operation surface. Therefore, in at least one embodiment, using a three-dimensional camera instead of the camera of the first embodiment, the operator himself/herself can accurately obtain the position of the hand on the virtual operation surface by additionally obtaining the z-directional position of the hand or the finger, and can determine whether the hand got across the operation surface. Therefore, the system configuration is similar to that of the first embodiment except for the use of the three-dimensional camera, and description of overlapped contents will be thereby hereinafter omitted. It should be noted that it is possible to apply the processing using the virtual operation surface in the present embodiment to both of the right and left operations. However, it is also possible to apply the aforementioned processing of the first embodiment to either of the right and left operations and apply the processing of the present embodiment to the other. Thus, in various embodiments, various manners of processing may be selected in accordance with a configuration and/or a usage situation of the system.

FIG. 5 is a diagram for explaining right and left virtual operation surfaces. In the illustrated embodiment, one or more of the video cameras 511 to 514 shown in FIG. 5 may be a three-dimensional camera. A stereo image that includes the operator may be created by using the three-dimensional (or 3D) camera as the video camera 511. In certain embodiments, two-dimensional cameras may also be used while being disposed to the right and left. For example, both of the video cameras 512 and 514 may be designed to be provided where, in this case, two-dimensional cameras are used as those cameras. In this manner, a stereo image may be created by the two video cameras 512 and 514.

Figure 9:
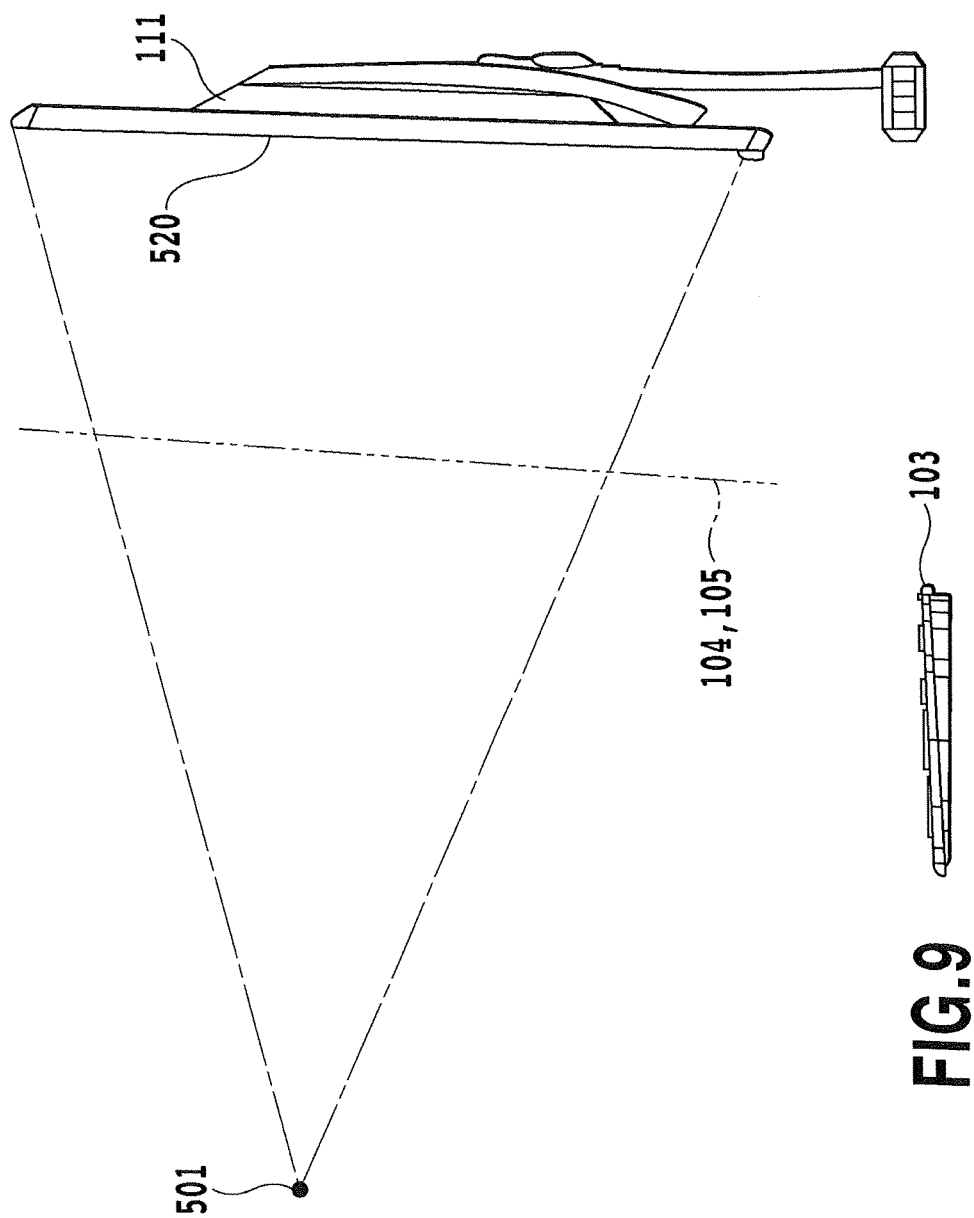
FIG. 9 is a side view of a virtual operation surface according to an embodiment.
Figure 10:
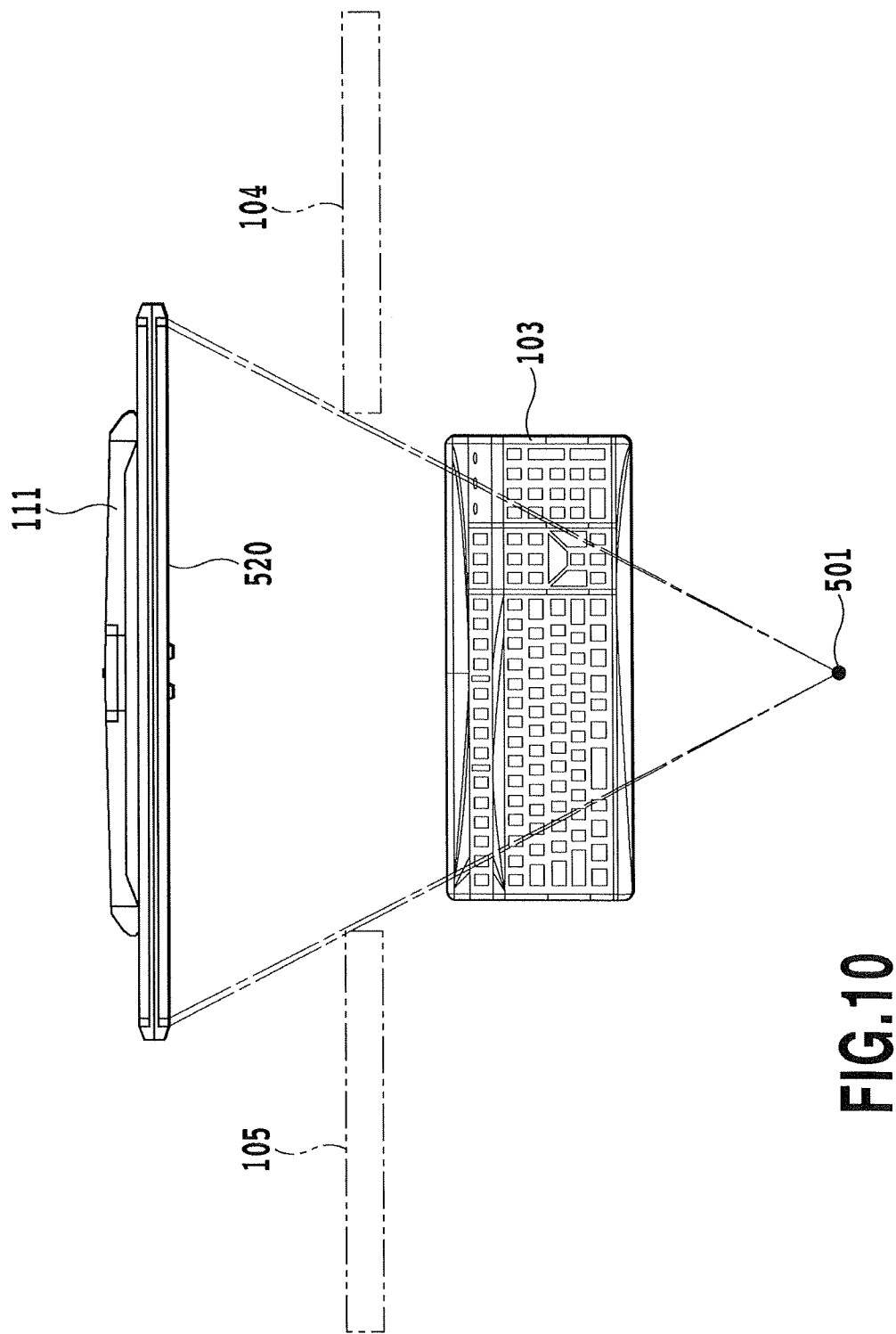
FIG. 10 is a top view of the virtual operation surface according to an embodiment.

FIGS. 9 and 10 are diagrams of operation surfaces seen from a lateral side and a top side. In at least the embodiment illustrated by FIGS. 9 and 10, operation surfaces 104 and 105 are disposed right and left so as to avoid contact with the square pyramid connecting the point-of-sight 501 of the operator and the four corners of the operation object screen 520. Here, the positions of the position determining surface 104 and the operation determining surface 105 may be set by the operator with the both hands opened at optimal positions to input operations in accordance with a usage environment in an initial setting step of a PC installation phase to be described. At this time, for instance, the positional information of the upper body of the operator such as the head, the both shoulders or the like, the positions of the both eyes of the operator, and the like are also complemented on the camera side, and the surfaces may be disposed and set in right and left symmetric positions that the operator seated at a desk can easily perform an operation using the both hands with the elbows rested on the desk. In certain embodiments, the positions of the surfaces can be optimally set in accordance with an operational environment of the operator. It should be noted that the position determining surface 104 and the operation determining surface 105, shown in FIGS. 9 and 10, may be disposed right and left so as to avoid contact with the aforementioned square pyramid. This is intended to prevent the hands 114 and 115 from blocking the field of view of the operator in executing an operation as described above. Therefore, in certain embodiments, the position determining surface 104 and the operation determining surface 105 may be disposed roughly right and left, regardless of whether the surfaces somehow interfere with the square pyramid.

Figure 7:
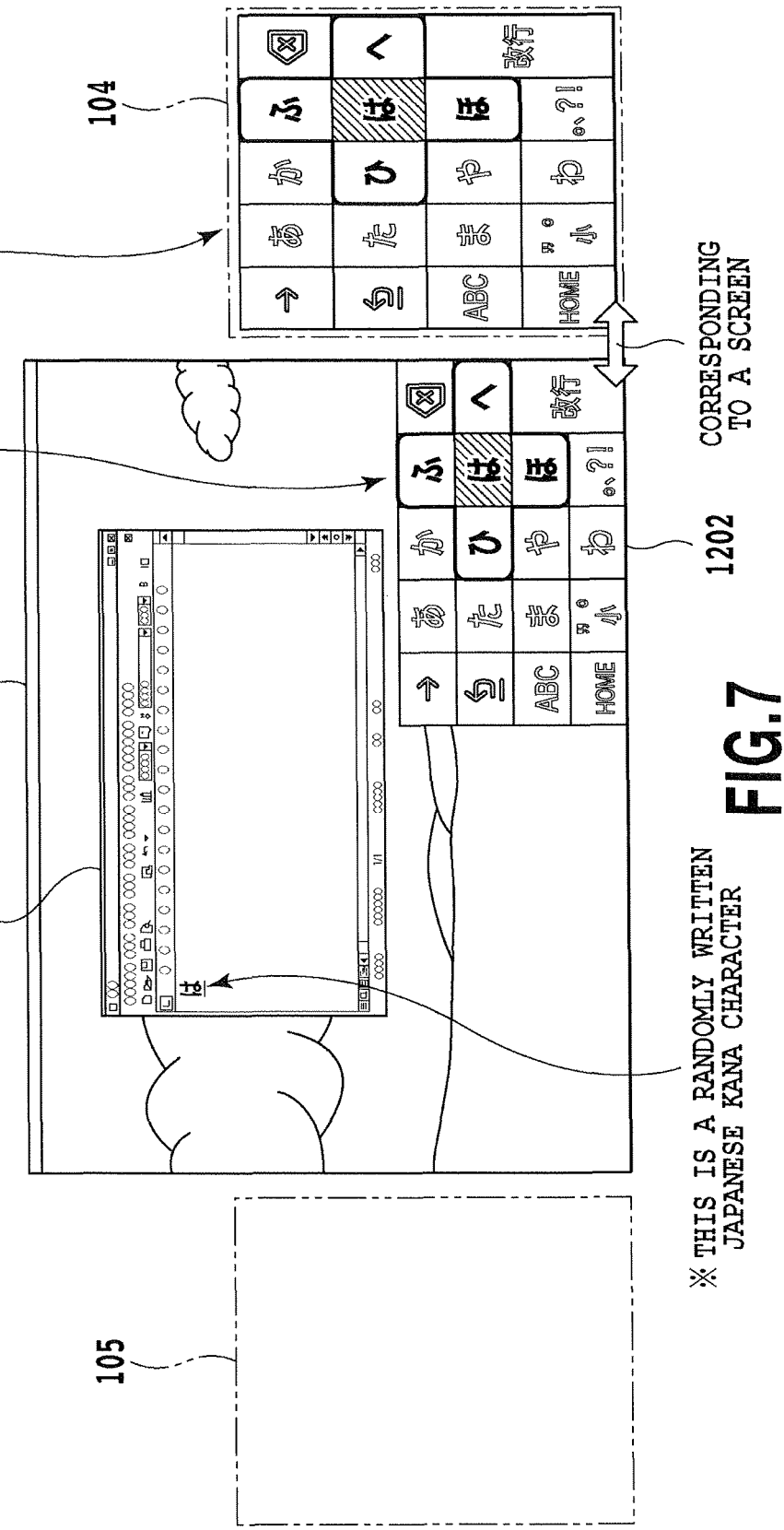
FIG. 7 is a diagram illustrating various functions of a screen and its corresponding operation surface according to an embodiment.
Figure 11:
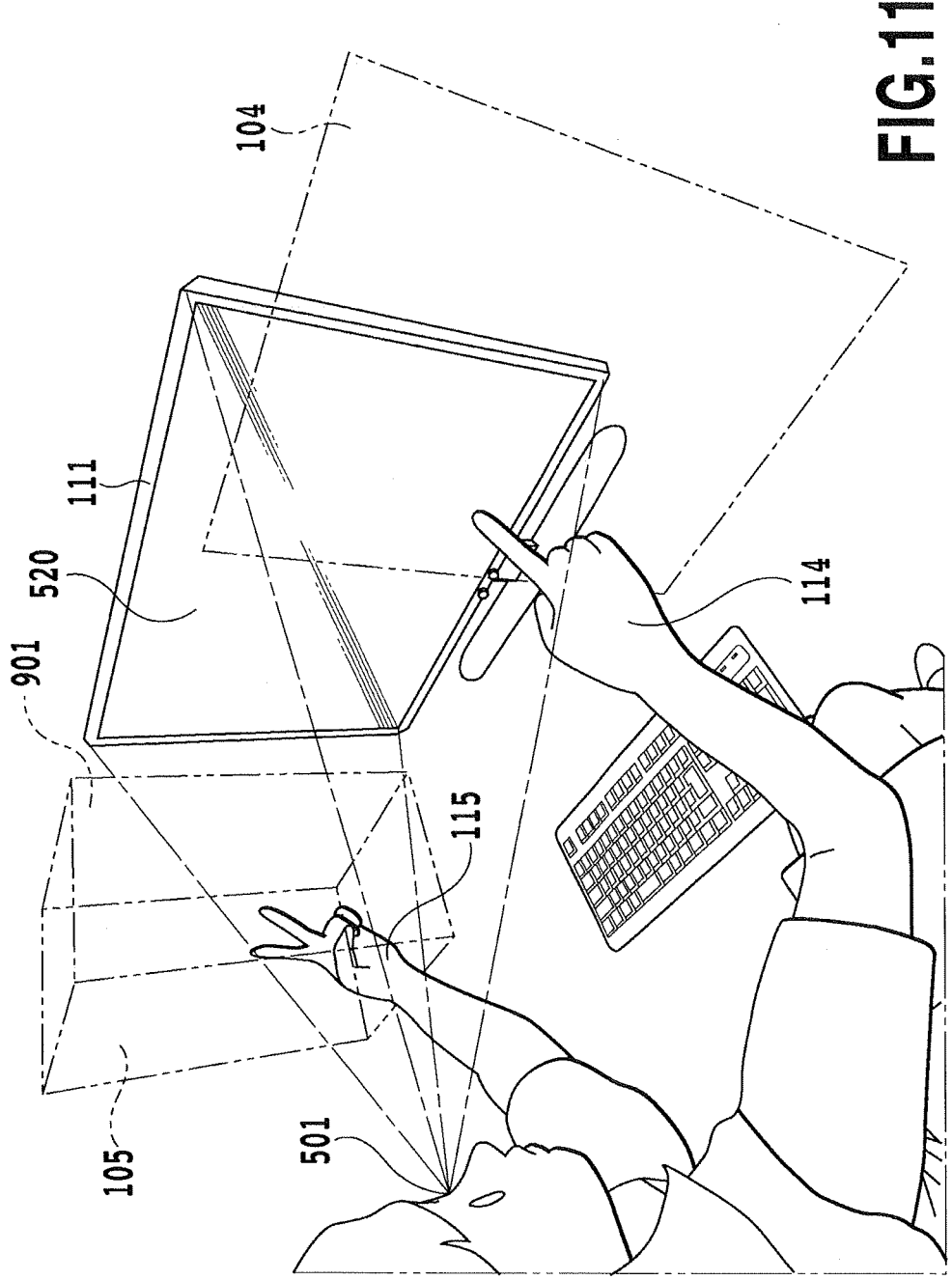
FIG. 11 is a diagram illustrating various functions of right and left operation areas according to an embodiment.
Figure 12:
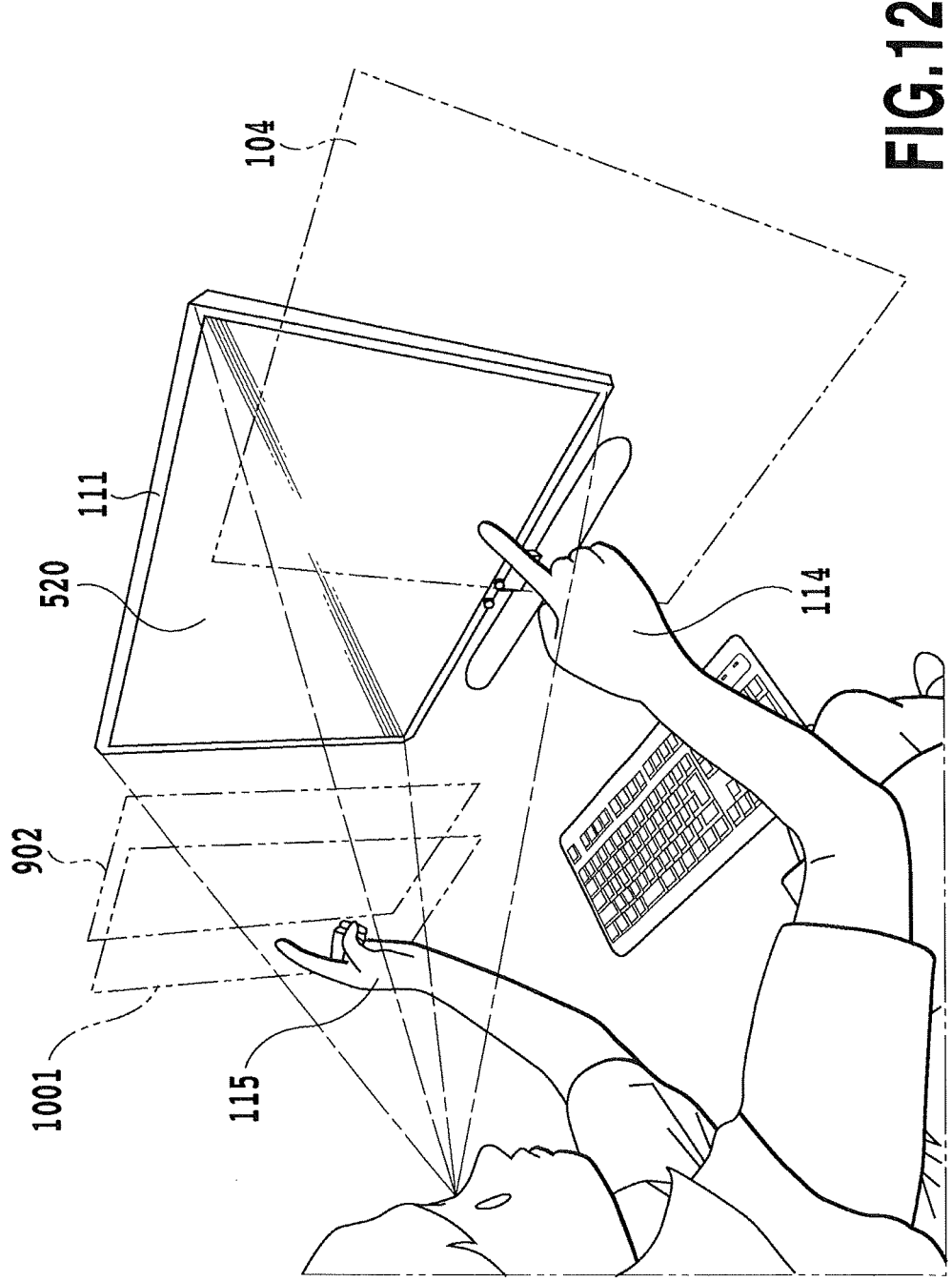
FIG. 12 is a diagram illustrating various functions of right and left operation areas according to an embodiment.
Figure 13:
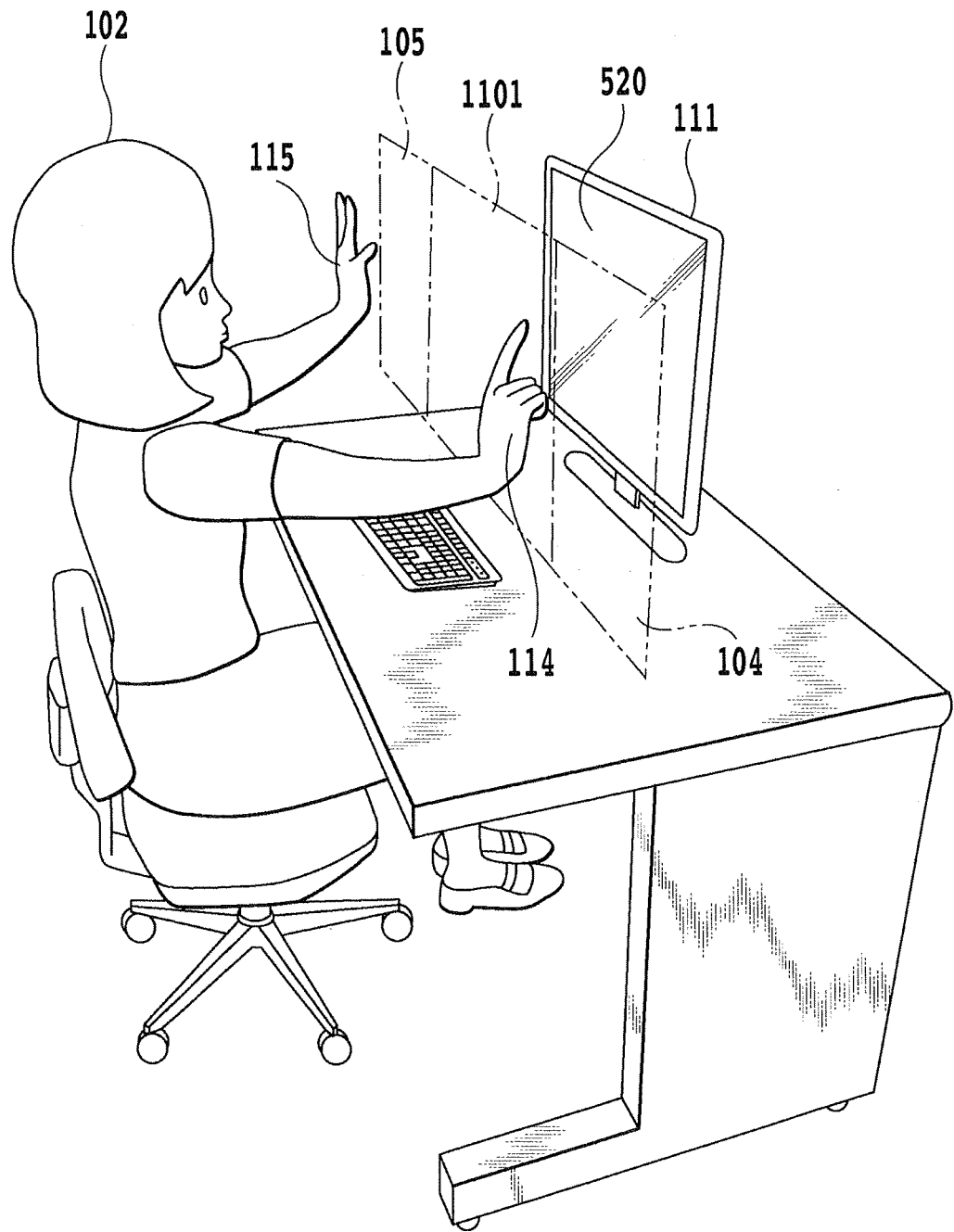
FIG. 13 is a diagram showing an example of an input operation through an operation input system according to an embodiment.

FIGS. 11 and 12 provide examples of certain functions of the two right and left operation surfaces. In the illustrated embodiment of FIGS. 11 and 12, the position determining surface 104 is in charge of a function of pointing or focusing, and as shown in FIG. 7, for instance, an area 1202 corresponding to the position determining surface 104 may be displayed in a suitable position on the display 111. It is accordingly possible to change the color of a relevant portion currently focused by the hand 114 or display an icon or the like not shown in the drawings. Thus, in at least the illustrated embodiment, the operator may be enabled to intuitively execute focusing with the hand 114 while watching the display 111 by changing the image on the display 111 in conjunction with moving of the hand 114 on the position determining surface 104.

Furthermore, where a certain area 901 is set for the operation determining surface 105 as shown in FIG. 11, an operation can be determined to be started when the hand 115 gets across the operation determining surface 105, and an operational content can be determined based on the shape or gesture of the hand 115 within the area 901. Thus, in the illustrated embodiment, the operating surfaces may be set based on the physical size information such as the height and the arm length of the operator 102 or the height and the shoulder width of the operator 102, whereas the operator 102 assumes that the preliminarily set operation determining surface 105 virtually exists, and can perform a gesture by protruding the hand 115 to the operation area 901 located ahead with reference to the operation determining surface 105 in trying to execute various operations.

in the embodiment depicted in FIG. 12, where two layers 902 and 1001 are set as the operation determining surface, an operation can be configured to be determined as: a click when the hand 115 penetrates only the first layer 1001; and a double-click when the hand 115 reaches the second layer 902. Thus, in certain embodiments, the operation determining surface may have two layers. In other embodiments, three or more layers can be set and various functions can be assigned thereto, respectively.

Figure 8:
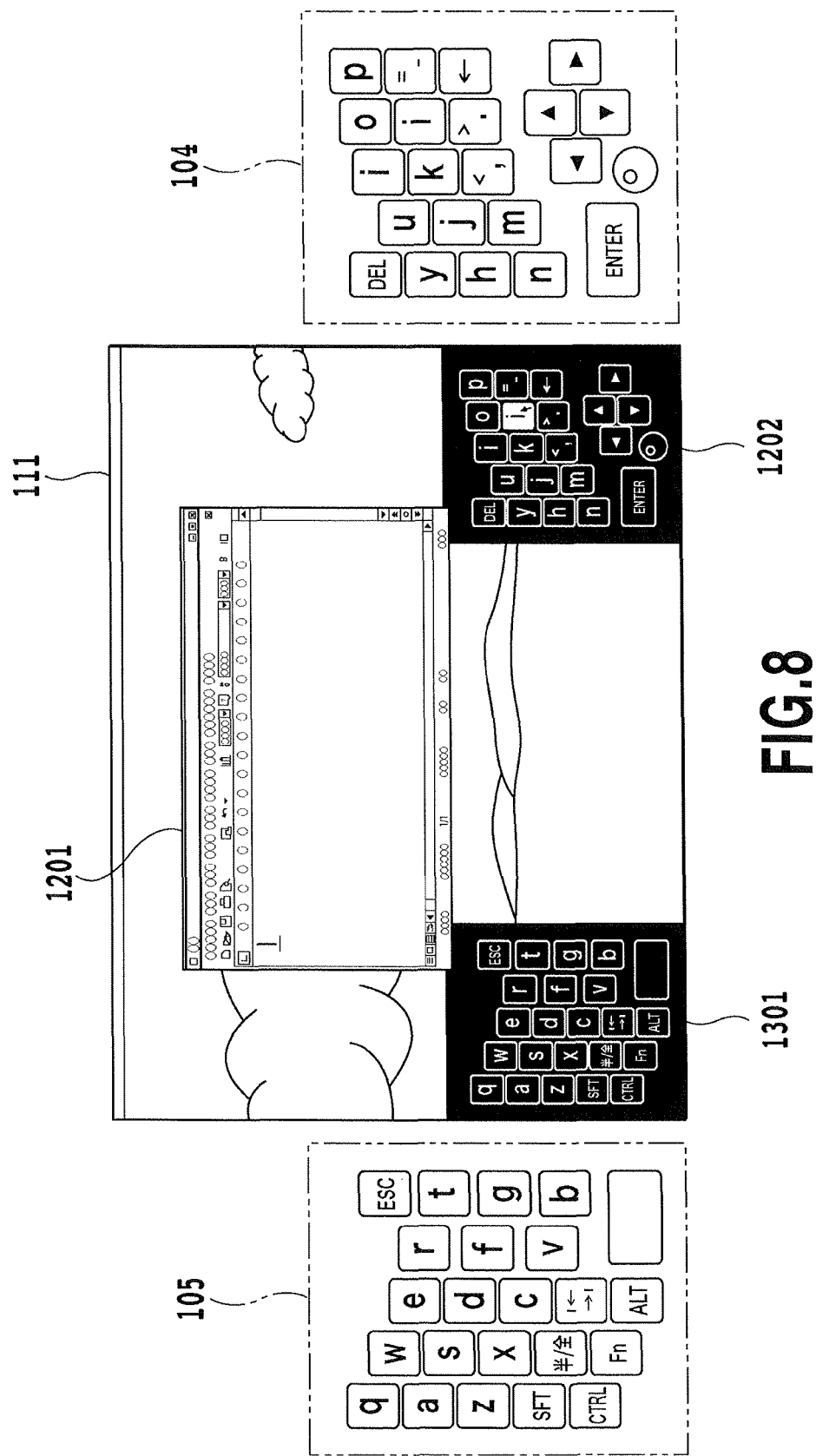
FIG. 8 is a diagram schematically illustrating various functions of a screen and a corresponding operation surface according to an embodiment.

Furthermore, in at least the embodiment illustrated in FIG. 7, for instance, the operation input system of the present embodiment may be configured to have a simple keyboard function. In other embodiments, the operation input system can be configured to have a normal keyboard function, as shown in FIG. 8. In such embodiments, where the right half of a normal keyboard is assigned to a right operation surface 104 while the left half of the normal keyboard is assigned to a left operation surface, the operator can perform focusing and determine an operation while watching keyboard layouts 1202 and 1301 on the display 111. It should be noted that in an operational determination of this case, the operation determining surface can be also produced, for instance, by setting another operation surface under the operation screen normally unused. Further, when the operation surface is thus provided under the operation screen, it is also possible to, for instance, assign only a space key thereto.

In at least one embodiment, a processing of setting operation surfaces is executed when the initial setting of the system is finished. As shown in the example of FIG. 20, the shapes (including the size and the angle with respect to the display) of the operation surfaces are determined based on the hands 114 and 115 of the image of the operator shot by the three-dimensional camera, and the positions of the operation surfaces 104 and 105 are determined, for instance, based on the z-directional distance from the display to the hands 114 and 115. For example, in the embodiment shown in FIG. 1, the operation surfaces 104 and 105 may be formed in the positions indicated by the operator with the hands 114 and 115.

Figure 23:
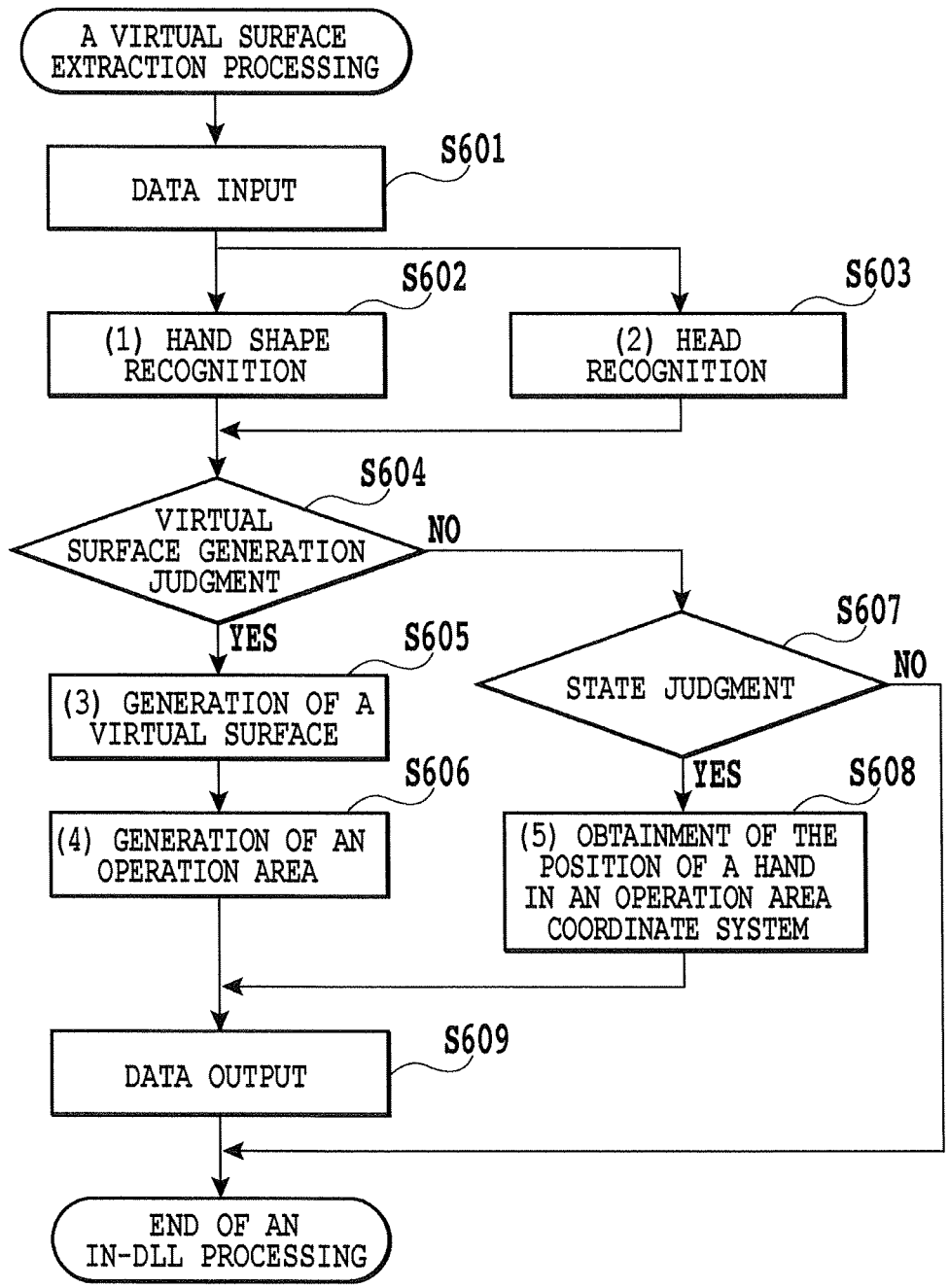
FIG. 23 is a flowchart depicting a process for extracting a specified position on an operation surface according to an embodiment.

Next, an operation surface extraction process will be explained with reference to FIG. 23. FIG. 23 is a flowchart showing a process of extracting specified positions on operation surfaces according to the present embodiment. First, when a set of data, i.e., a set of stereo image data of an operator is input (S601), the shapes of the hands and the head are recognized (S602, S603) and it is determined whether operation surfaces are formed (S604). Specifically, in the illustrated embodiment, when gestures of laying on of the hands with the elbows put on the desk were kept for a predetermined period of time, for instance, it is determined that the gestures were performed for executing a process of setting the operation surfaces, and the operation surfaces are extracted from the obtained stereo image and are formed in the positions instructed by the operator with the hands (S605). If necessary, operation areas are set based on measurement values of the body of the operator such as the lengths of the arms and/or the position of the trunk and/or that of the head (S606) and the process is finished by outputting a set of data (S609). In at least the illustrated embodiment, it may be determined that an instruction of setting the operation surfaces is executed by holding a motion of laying on of the hands with the elbows put on the desk for a predetermined period of time. In certain embodiments, determination of an instruction can be executed by any of the methods known in the field of the present art, including instructions by various gestures, an operation of a remote controller and the like. In at least some embodiments, the operation surfaces are basically formed in the shapes and positions formed by the hands, but can be also adjusted in accordance with the physical characteristic of the operator, the position of the display, a usage condition or the like.

Still referring to FIG. 23, it is determined that the processing of setting the operation surfaces is not intended to be based on the recognition of the head and the gestures of the hands, it is determined whether the operation surfaces have been already set (S607). When the operation surfaces have been set, it is determined that a normal operation is intended and the positions of the hands within the operation areas are obtained (S608). Based on the above, the processing of setting the operation surfaces is executed based on the instruction of the operator.

In certain embodiments (such as that of FIG. 1), the operation surfaces are herein formed in a vertically standing rectangle. In other embodiments, it is possible to form the operation surfaces in various shapes (including the size and the angle with respect to the display) in accordance with an operational form of the operator. For example, in the embodiment of FIG. 18, a position determining surface 1801 and an operation determining surface 1802 can be also disposed on the desk, while an operational input can be also enabled with a feeling of using a keyboard and/or a mouse. In certain embodiments, in order to implement such arrangement of the operation surfaces, the operation surfaces may be preliminarily set by putting the hands on the desk in setting the operation surfaces and by performing predefined gestures.

Figure 22:
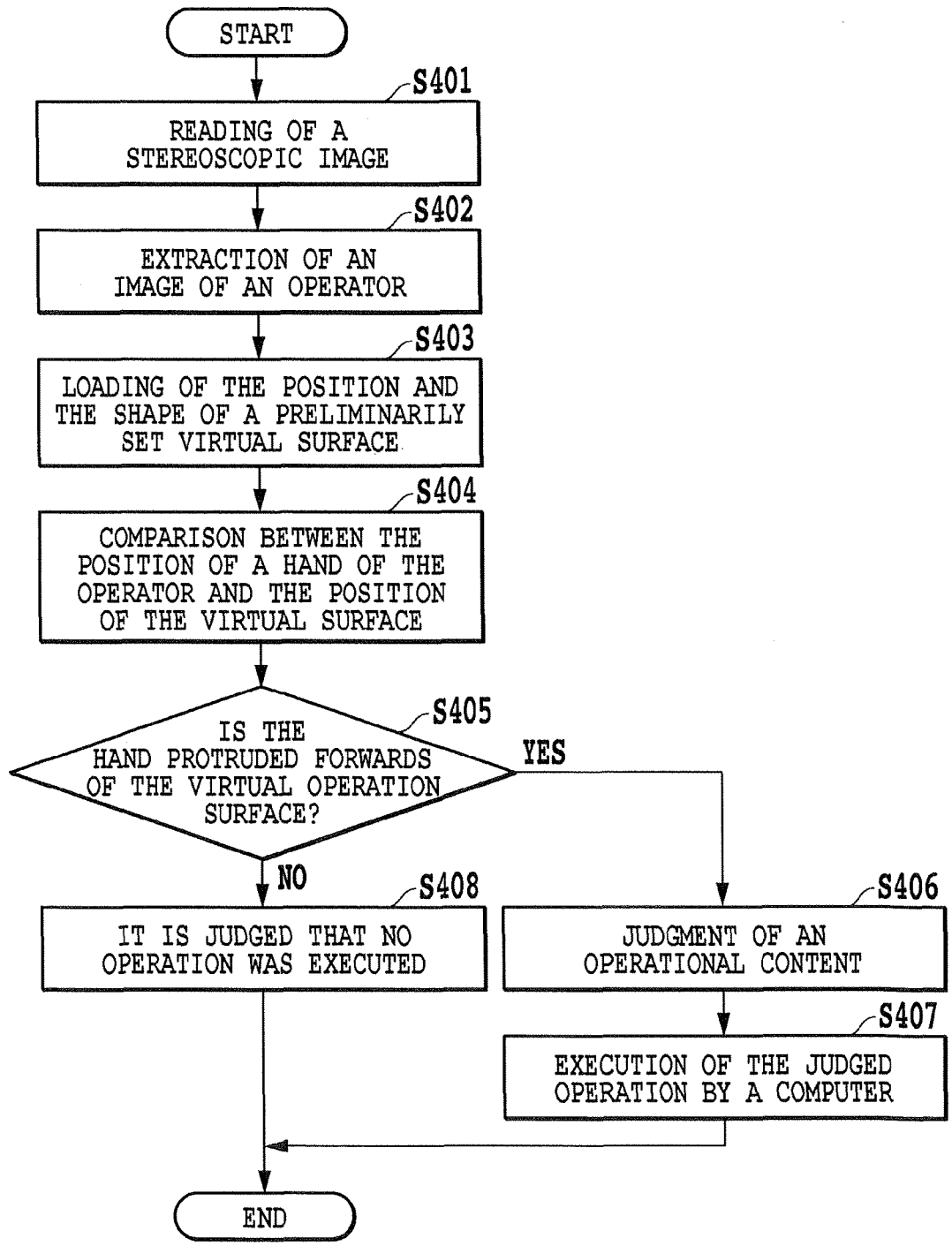
FIG. 22 is a flowchart depicting a process in accordance with an embodiment.

FIG. 22 is a flowchart of an operation determination processing according to at least one embodiment. In the illustrated embodiment, a processing is executed for: setting the positions of the hands and the fingers 114 and 115, which are a part of the operator 102, shot by the video camera 511 and/or the like; and calculating positional relations between the operation surfaces 104 and 105 and the hands and the fingers 114 and 115 of the operator 102.

First, the image reading part 301 reads a set of data shot by the video camera 511 and/or the like (S401), and the image extracting part 302 extracts an image of the operator from the set of data (S402). As a result of such preparation, the positions and the shapes of the operation surfaces are loaded, which have been preliminarily set in the aforementioned setting of the operation surfaces and have been stored in storage means or the like (S403). When the shapes and the positions of the operation surfaces are thus loaded, the indicator controlling part 305 displays an icon or the like in a position on the display 111 corresponding to the position of the hand 114 on the operation surface 104 and controls the icon or the like to move in conjunction with moving of the hand by any of the methods known in the field of the present art. Therefore, the operator is enabled to accurately touch the position on the operation surface corresponding to the displayed icon with the finger or the hand, and therefore, can execute operations such as touching an icon displayed on the display surface.

The operation determining part 304 uses relative positional relations between the operation surfaces formed by the operation input system and the operator 102 (S404), determines that an operation was started when a part of the operator 102 was positioned forwards of the operation surface seen from the video camera 511 and/or the like (S405), and determines the position of the hand 114 on the position determining surface 104 and moves the icon to a corresponding position on the display unit, while determining to which preliminarily assumed operation the shape of the hand 115 (e.g., the hand is opened or two fingers are extended upwards) and/or the motion of the hand 115 correspond, based on the shape and/or the motion of the hand 115 with reference to the operation determining surface 105 (S406). As a result, it is determined that such operational input was executed and the determined operation is executed by the computer 110 (S407). When the hand has not been extended forwards across the operation surface from the beginning, it is determined that an operation has not been executed and the processing is finished (S408). In various embodiments, other methods may be also used for determination of the operational content.

In at least some embodiments, the operator performs an operation with reference to the operation surfaces virtually set in a space as if an input apparatus as an alternative of a mouse existed thereon, and the operational content is configured to be reliably determined. An operation input can be more easily and accurately configured to be executed by supporting the operation until the hand or the finger as a part of the operator reach the operation surface, i.e., even from when the operator starts moving the hand or the finger to execute some kind of operation until the operator presses the operation surface. Such functions may be effective in a pointing or focusing function. However, such functions may also be effective in operational determination using the operation determining surface. Therefore, the present function will be explained by exemplifying the position determining surface as a normal operation surface virtually set.

Basically, such principle of operational support refers to the one that an operator is guided and enabled to perform an accurate operation input by visually displaying on the display 111 what kind of operation the operator is trying to perform in accordance with moving of the position of a part of the operator such as the hand or the finger with respect to the operation surface.

Figure 14:
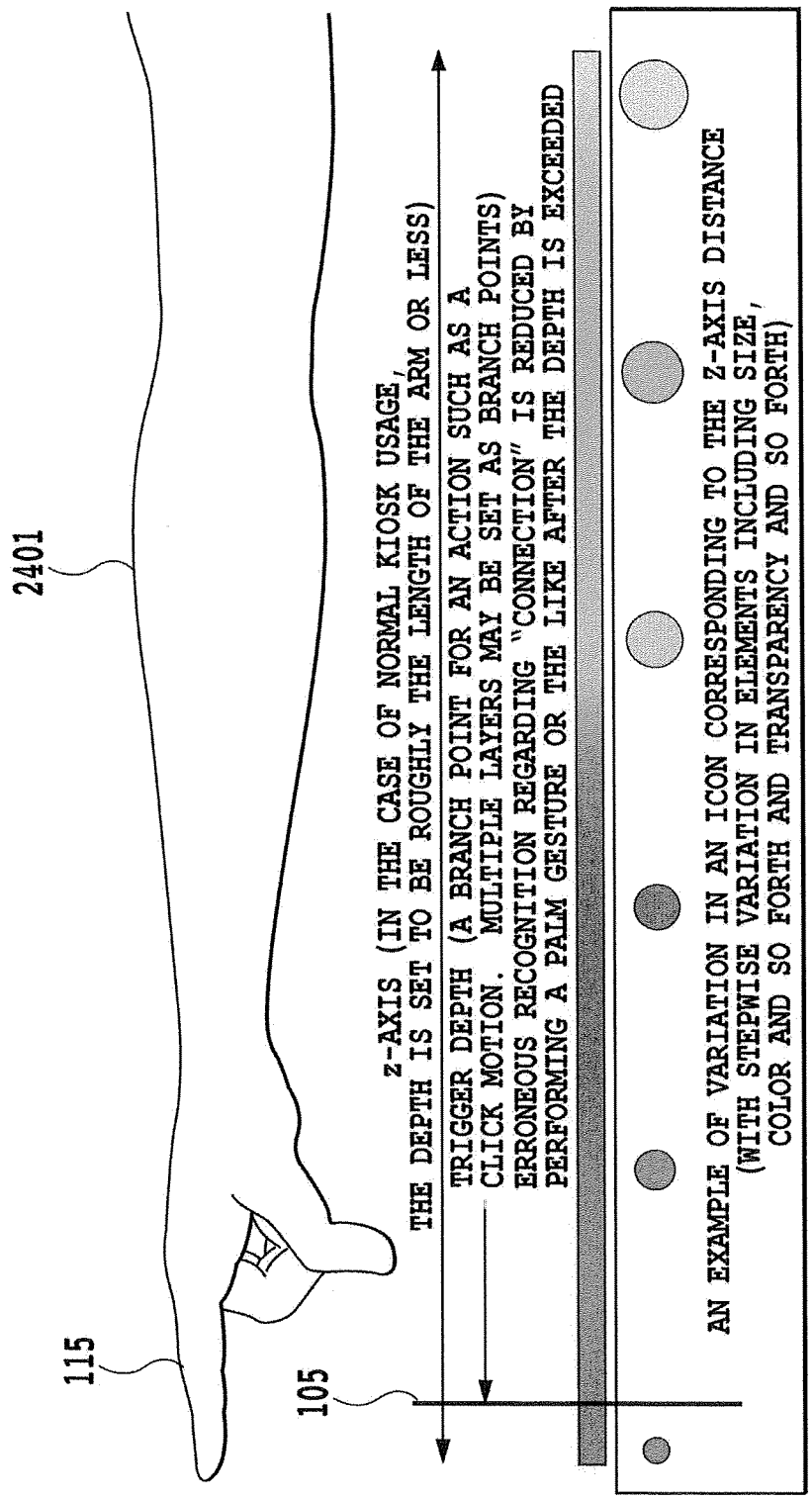
FIG. 14 is a diagram showing a relation between a motion of an operator and an icon displayed on a screen according to an embodiment.

When explanation is provided in this regard with reference to the embodiment depicted in FIG. 14, the operation surface 104 has been preliminarily set in the position suitable for an operation by the operator with respect to the operation surface. As shown in FIG. 14, when the operator tries to perform some kind of operation with respect to the system, in the present example, the position of the hand or finger 114 is changed by moving an arm 2401 back and forth with respect to the display 111. Therefore, when the situation is displayed on the display 111, the system executes a certain processing such as a processing that an item, instructed by the protruded finger 114 on the screen of the display 111, is executed when the finger 114 reaches a certain position. In the example of FIG. 14, the size of the icon is configured to be changed in accordance with the position (depth) of the finger 114 with respect to the operation surface 104. Accordingly, the icon gets smaller when the finger 114 gets closer to the operation surface. Thus, the operator is enabled to recognize that a certain position is focused by one's operation. Then, the operation is settled in the position where the icon gets smallest and a processing in accordance with the operation will be executed.

Figure 15:
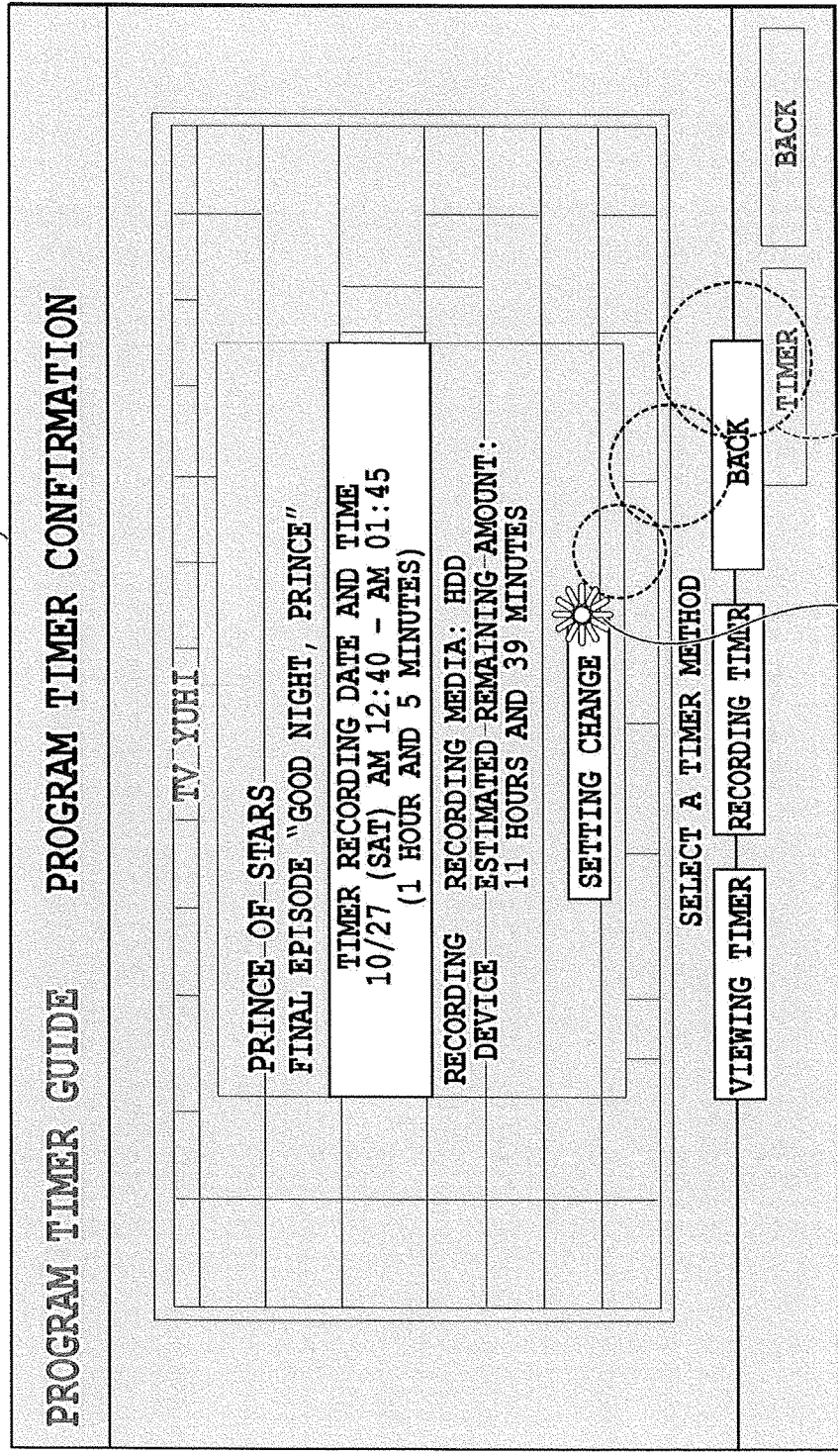
FIG. 15 is a diagram showing an example of specific display of an operation input screen according to an embodiment.

FIG. 15 shows how the icon is changed on a screen 2501 of the display 111 as a result of the aforementioned operation. With reference to FIG. 15, a TV program schedule is displayed on the screen 2501 of the display 111, for instance, and an operation is being tried for a given TV program. For example, when trying to select a menu button "SETTING CHANGE" under such condition, the operator tries to select it by protruding the finger 114 towards the display 111 as described above. In the illustrated embodiment, an icon 2503 is displayed on the screen 2501 when the finger 114 gets closer to the TV program schedule as the operation surface at a certain distance. A relatively large one, located rightwards among the icons shown in FIG. 14, is displayed as this icon, because the position of the finger is still far away. When the operator further extends the arm 2401, this icon gets smaller while getting closer to the selection item "SETTING CHANGE" as an objective, and becomes a special icon when changed into an icon 2502 with a certain size. When the operation is herein determined to correspond to any of the predefined operations by the operation determining surface 105 of the present embodiment, it is possible to indicate that the operation has been determined by changing the icon in a different shape, color and/or the like.

Thus, in at least the embodiment of FIG. 15, through the change of the size of the icon displayed on the screen 2501 in accordance with the position of the finger 114, the operator can grasp how one's motion is recognized in the system. Further, by making the position of the operation surface more easily recognizable, the operator can perform an operation such as selection of a menu. It is herein possible to extract the position and the size of the entire body including the finger 114 and the arm 2401 of the operator and those of the respective parts of the operator using a three-dimensional camera similarly to the case of the entire image of the operator. It is thereby possible to grasp an object within the screen including the depth thereof. Therefore, it is possible to calculate the distance to and the positional relation with the operation surface based on the pieces of information. In certain embodiments, various known methods can be used for the three-dimensional camera used in the present embodiment, extraction of positions, calculation of distances and the like. Therefore, explanation thereof will be herein omitted.

Figure 16:
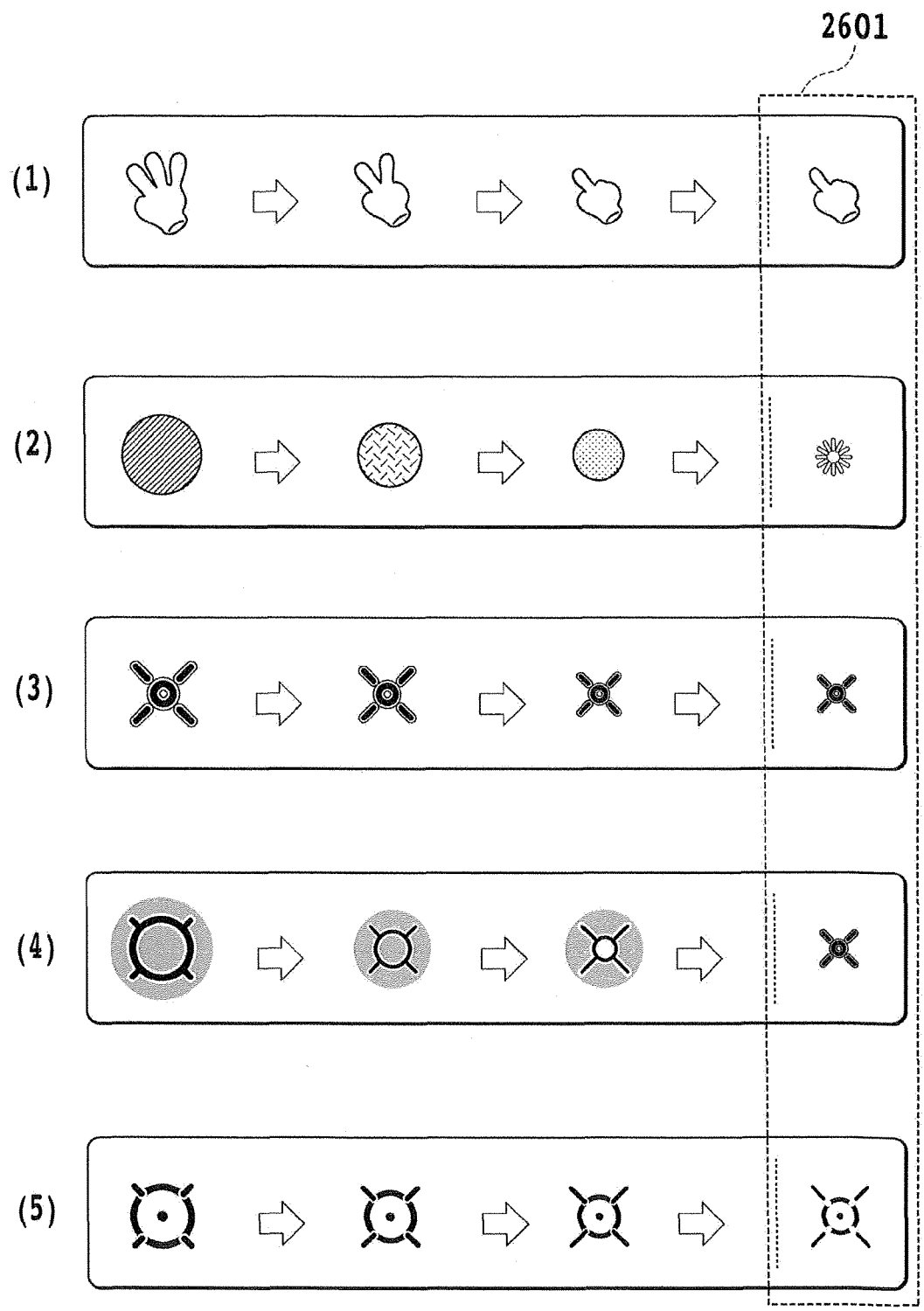
FIG. 16 is a diagram showing examples of various icons usable on an operation input screen according to an embodiment.
Figure 17:
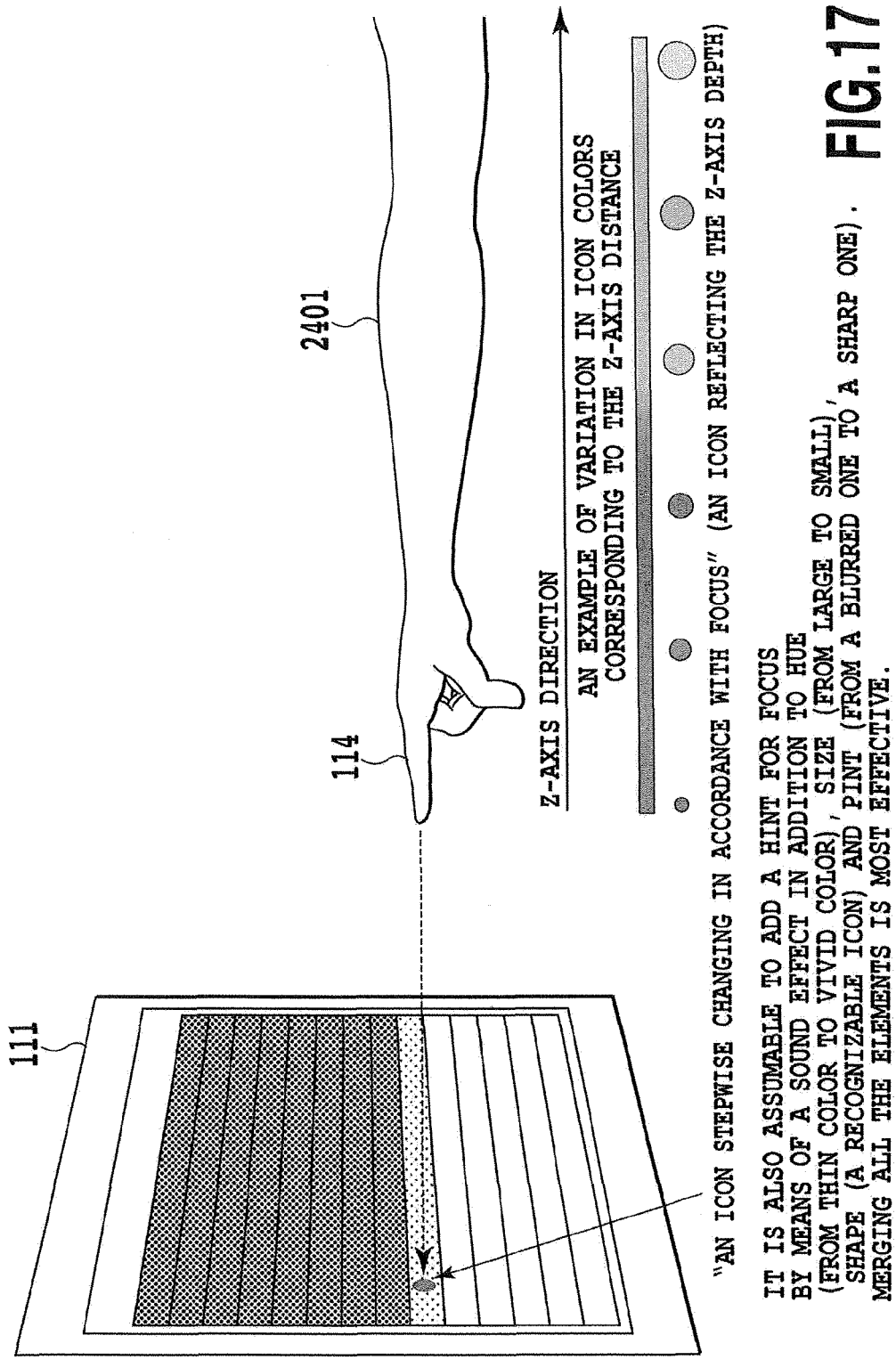
FIG. 17 is a diagram showing a relation between a motion of an operator and an icon displayed on a screen according to an embodiment.

In the illustrated embodiment, the icon displayed on the screen has a circular shape and changes its size in accordance with the motion of the operator. However, in various embodiments, icons with various forms can be used and variously changed, as shown in FIG. 16. In short, with reference to FIG. 16, an icon (1) is formed in a finger shape and is configured to get smaller as the hand gets closer to the operation surface, similarly to the aforementioned example. An icon (2) is formed in a circular shape and is configured to get smaller. However, when an input or selection is settled by the operation determining surface, the icon is configured to be changed into a special shape for indicating the settlement. Not only this icon but also other icons can be also configured to change the color thereof either instead of or in accordance with the change of the shape thereof (including the size and the angle with respect to the display). For example, an operator can intuitively recognize that an operation is focused and settled through the color change from a cold color to a warm color, among blue, green, yellow, red and the like. For example, in the illustrated embodiment, an icon (3) is formed in an X-like shape, and is configured to not only have a large size but also be blurred when located far, while being configured to reduce the icon size and be deblurred to form a sharp shape as the hand gets closer to the operation surface. An icon (4) is configured to make the operator recognize a situation that the icon is focused while a diagram drawn in the icon changes the shape thereof without changing the entire size of the icon. In this case, the color of the diagram can be also changed. An icon (5) shown in FIG. 16 is also configured to change the shape thereof. As shown by FIG. 23, in certain embodiments it is also possible to make the operator to recognize that a motion of a finger was determined as an operation by changing the shape, color and/or the like of an icon in accordance with the motion of the finger and by either changing the icon into various shapes and/or colors as shown in a field 2601 or blinking the icon at the moment when the finger gets across the operation surface. Furthermore, although not shown in the drawings, among other icon changes, such a change is also effective that an icon is originally transparent but becomes opaque as the finger gets closer to the operation surface. In at least some embodiments, it is also possible to inform the operator of a focusing condition by additionally providing a stereo display function of the display as described below and by creating an image as if an icon popped out of the screen when being focused.

Where the color or density of the icon is herein especially changed without changing the shape of the icon among variations of the icon, it is possible to settle an input by changing the color of the icon into a warm color or thickening the color of the icon without moving the icon that much as shown in FIG. 16 when the finger 114 gets closer to the operation surface.

Furthermore, in the aforementioned example, the icon is displayed in a position on the operation surface and the color and/or the shape thereof are changed in accordance with the motion of the operator in order to check a determination condition for an operation. In certain embodiments, such as in situations where positions to be indicated are originally fixed as with a menu, without purposely displaying icons, an indicated position is determined based on which of the item buttons on the displayed menu the position indicated by the finger is closest to. The color or density painting the indicated item button is changed in accordance with the motion of the finger, especially, the distance from the operation surface. Thus, it is possible to make the position of the operation surface more recognizable and simplify operation input.

As described above, in certain embodiments, the operation surface is roughly vertically formed in a position horizontally forwards of an operator. However, various embodiments may enable various arrangements and configurations for the operation surface without being affected by such positional relation between the operator and the display and/or the shape of the operation surface.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

The invention claimed is:

1. An operation input apparatus, comprising:
  a display for displaying an image to be viewed by an operator;
  one or more imaging devices for generating a set of data regarding an image of the operator, the one or more imaging devices disposed in a vicinity of the display while being faced to the operator;
  one or more processors to preliminarily set a control area to enable a first part of the operator to control a predetermined indicator displayed on the display and to preliminarily set a determination area for determining whether an operation related to a position of the indicator on the display surface of the display has been executed, the control area and the determination area being separated into a respective right side and a respective left side of the operator such that the control area and the determination area are separated by a non-sensing buffer area;
  one or more control components for extracting the first part of the operator from the image of the operator and for moving the indicator in accordance with a positional relation between the first part of the operator and the display when the first part of the operator is located within the set control area, the one or more control components being configured to determine a motion of the first part of the operator in the control area; and
  one or more operation determining components for extracting a distinct second part of the operator from the image of the operator and determining whether the operation related to a position of the indicator on a display surface of the display has been executed in accordance with a motion of the distinct second part of the operator within the set determination area, the one or more operation determining components being configured to determine the motion of the second part of the operator in the determination area;
  wherein the one or more processors preliminarily set the determination area and the control area such that a size of the non-sensing buffer area is set in accordance with a body shape of the operator so as to have an appropriate size to avoid a degree of confusion with respect to motions of the first part of the operator and of the distinct second part of the operator.

2. The operation input apparatus of claim 1, wherein:
  the control area is defined by the image of the operator read by the one or more imaging devices.

3. The operation input apparatus of claim 2, wherein:
  the first part of the operator is one of a right hand of the operator and a left hand of the operator, and the distinct second part of the operator is the other of the right hand of the operator and the left hand of the operator.

4. The operation input apparatus of claim 3, further comprising extracting a face of the operator from the image and defining a center of the operator based on the extracted face of the operator.

5. The operation input apparatus of claim 1, wherein the one or more processors determine in which of the right and left positions each of the control area and the determination area should be disposed based on a series of predefined motions of the operator read by the one or more imaging devices.

6. The operation input apparatus of claim 1, wherein the one or more processors preliminarily set the control area and the determination area based at least in part on a series of predefined motions of the operator read by the one or more imaging devices.

7. The operation input apparatus of claim 1, wherein the non-sensing buffer area includes an area defined by connecting a point-of-sight of the operator and respective apices of the display surface of the display.

8. The operation input apparatus of claim 1, wherein the one or more processors preliminarily set the control area such that the control area includes a range indicated by a series of predefined motions of the operator read by the imaging devices, and wherein the non-sensing buffer area includes an area defined by connecting a point-of-sight of the operator and respective apices of the display surface of the display.

9. The operation input apparatus of claim 8, wherein:
  at least one of the one or more imaging devices is a three-dimensional imaging device for generating a set of data regarding a stereo image of the operator;
  the one or more processors preliminarily set a position determining surface associated with the display surface of the display as the control range based on a series of predefined motions of the operator read by the imaging devices so that the non-sensing buffer area includes the area defined by connecting the point-of-sight of the operator and the respective apices of the display surface of the display; and
  the one or more control components move the indicator to a position on the display surface corresponding to a position of the first part of the operator on the set position determining surface.

10. The operation input apparatus of claim 9, further comprising:
  one or more determination range setting components for preliminarily setting the determination area as an area to enable a distinct second part of the operator to define an area that is indicated by a series of predefined motions of the operator read by the imaging devices and that is not overlapped with the position determining surface and that does not interfere with the non-sensing buffer area,
  wherein the one or more operation determining components extract the distinct second part of the operator from the image of the operator and, based at least in part on a series of motions of the distinct second part when the distinct second part is located within the set determination area, determine that a predefined operation associated with the series of motions of the distinct second part has been executed.

11. The operation input apparatus of claim 10, wherein:
  the determination area setting components preliminarily set an operation determining surface associated with the display surface of the display as the determination area based on the series of predefined motions of the operator read by the imaging devices so that the operation determining surface is not overlapped with the control range and does not interfere with the non-sensing buffer area; and the one or more operation determining components extract the distinct second part of the operator from the image of the operator and determine that an operation associated with the series of motions has been executed when the distinct second part is located between the set operation determining surface and the display.

12. The operation input apparatus of claim 9, wherein the position on the display surface is indicated by calculating a distance of the position determining surface from the operator based on a positional relation between the part of the operator and the position determining surface and by moving the indicator in accordance with the distance.

13. The operation input apparatus of claim 8, wherein the one or more operation determining components extract the distinct second part of the operator from the image of the operator, and based on a series of motions of the distinct second part, determine that a predefined operation associated with the series of motions of the distinct second part has been executed.

14. The operation input apparatus of claim 13, further comprising:

one or more determination area setting components for preliminarily setting the determination area as an area to enable the distinct second part of the operator to execute a determination based at least in part on the series of predefined motions of the operator read by the imaging devices, wherein the one or more operation identifiers determine, based at least in part on the series of motions of the distinct second part of the operator when the distinct second part of the operator is located within the set determination area, that the predefined operation associated with the series of motions of the distinct second part has been executed.

15. The operation input apparatus of claim 14, wherein:

at least one of the one or more imaging devices is a three-dimensional imaging device for generating a set of data regarding a stereo image of the operator;

the determination area setting components preliminarily set an operation determining surface associated with the display surface of the display as the determination area based on the series of predefined motions of the operator read by the imaging devices so that the operation determining surface is not overlapped with the control range and does not interfere with the non-sensing buffer area;

the non-sensing buffer area includes an area defined by connecting the point-of-sight of the operator and the respective apices of the display surface of the display; and the one or more operation determining components extract the distinct second part of the operator from the image of the operator and determine that the operation associated with the series of motions has been executed when the distinct second part is located between the set operation determining surface and the display.

16. The operation input apparatus of claim 15, wherein:

the one or more determination area setting components set two or more virtual operation layers to be defined as the determination area based at least in part on a positional relation with the operation determining surface; and when the distinct second part of the operator is read within any of the two or more virtual operation layers, the operation identifiers determines a content of the operation based at least in part on an operational type preliminarily allocated to the relevant virtual operation layer and the series of motions of the distinct second part within the relevant virtual operation layer.

17. The operation input apparatus of claim 8, further comprising:

a voice recognizing component for recognizing a voice of the operator, wherein, when a voice recognized by the voice recognizing component is a predefined voice, the operation determining components determine that an operation corresponding to the predefined voice has been executed.

18. The operation input apparatus of claim 8, wherein the one or more imaging devices include two imaging devices respectively disposed on a right side and left side of the display, and the two imaging devices respectively take a first image of the first part of the operator and a second image of the distinct second part of the operator.

19. An operation input method, comprising:

displaying, with a display, an image to be viewed by an operator; and generating, by one or more imaging devices disposed in a vicinity of the display while being faced to the operator, a set of data regarding an image of the operator watching the display;

preliminarily setting a control area to enable a first part of the operator to control a predetermined indicator displayed on the display and a determination area for determining whether the operation related to a position of the indicator on the display surface of the display has been executed, the control area and the determination area being separated by a non-sensing buffer area;

extracting the first part of the operator from the image of the operator;

moving the indicator in accordance with a positional relation between the first part of the operator and the display when the first part of the operator is located within the control area; and determining whether an operation related to a position of the indicator on a display surface of the display has been executed in accordance with a motion of a distinct second part of the operator within the determination area;

wherein preliminarily setting the control area and the determination area includes setting the control area and the determination area such that a size of the non-sensing buffer area is set in accordance with a body shape of the operator so as to have an appropriate size to avoid a degree of confusion with respect to the first part of the operator and the distinct second part of the operator.

* * * * *